United States Patent
Satoh et al.

(10) Patent No.: US 7,903,283 B2
(45) Date of Patent: Mar. 8, 2011

(54) IMAGE FORMING METHOD AND INK-JET PRINTING DEVICE

(75) Inventors: Taku Satoh, Kanagawa (JP); Takashi Kimura, Kanagawa (JP); Masakazu Yoshida, Kanagawa (JP); Toshihito Kamei, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1090 days.

(21) Appl. No.: 11/587,368

(22) PCT Filed: Mar. 14, 2006

(86) PCT No.: PCT/JP2006/305467
§ 371 (c)(1),
(2), (4) Date: Oct. 23, 2006

(87) PCT Pub. No.: WO2006/098456
PCT Pub. Date: Sep. 21, 2006

(65) Prior Publication Data
US 2008/0024801 A1 Jan. 31, 2008

(30) Foreign Application Priority Data

Mar. 18, 2005 (JP) .................................. 2005-078349
Jul. 21, 2005 (JP) .................................. 2005-210724

(51) Int. Cl.
*G06F 15/00* (2006.01)
(52) U.S. Cl. ......................................... 358/1.9; 358/411
(58) Field of Classification Search .................... 358/1.9, 358/3.02, 3.06, 3.09, 3.18; 399/411
See application file for complete search history.

(56) References Cited

U.S. PATENT DOCUMENTS

| 5,149,140 A | 9/1992 | Mowry, Jr. et al. |
| 2003/0076540 A1 | 4/2003 | Hamashima et al. |
| 2005/0041263 A1 | 2/2005 | Ishikawa et al. |
| 2005/0135856 A1* | 6/2005 | Uchida et al. ................. 399/411 |
| 2007/0206226 A1 | 9/2007 | Kimura et al. |

FOREIGN PATENT DOCUMENTS

| EP | 1302329 A2 | 4/2003 |
| JP | 5-229112 | 9/1993 |
| JP | 11-78060 | 3/1999 |
| JP | 2003-80690 | 3/2003 |
| JP | 2003-152982 | 5/2003 |
| JP | 2004-98519 | 4/2004 |
| JP | 2004-228896 | 8/2004 |
| JP | 2004-260341 | 9/2004 |
| JP | 2005-72777 | 3/2005 |
| WO | WO2006/098457 A1 | 9/2006 |

OTHER PUBLICATIONS

Apr. 3, 2009 European search report in connection with a counterpart European patent application No. 06 71 5696.
Sep. 7, 2010 Japanese official action in connection with counterpart Japanese patent application.

* cited by examiner

*Primary Examiner* — Twyler L Haskins
*Assistant Examiner* — Michael Burleson
(74) *Attorney, Agent, or Firm* — Cooper & Dunham LLP

(57) ABSTRACT

An image forming method is provided for use with an ink-jet printing device which forms a dot on a recording medium by ejecting a drop of recording liquid. In the image forming method, an image in which a ground tint is embedded in one of a foreground part and a background part of an original image is formed, the ground tint indicating that copying of the original image is inhibited. A recording liquid adhesion area of the dot per unit area in the foreground part is made different from a recording liquid adhesion area of the dot per unit area in the background part.

8 Claims, 14 Drawing Sheets (a)

611
611
612

COPY (b)

IMAGE FORMING METHOD AND INK-JET PRINTING DEVICE

TECHNICAL FIELD

The disclosure relates to an image forming method and an ink-jet printing device for carrying out a printing of an image in which a ground tint is embedded which indicates that copying of an original image is inhibited.

BACKGROUND ART

Conventionally, there are various printed matters that has an original image copying of which is inhibited, which include certificates, important documents, etc., such as a resident card or a copy of a family register, and negotiable securities, such as a bank note, a stock certificate, a debenture, etc. In order to prevent unauthorized copying of the original images of such printed matters which is not permitted, there are proposed several methods and devices for enabling recognition and distinction that the reproduced image is a copy of the original image at the time of reproduction of the image.

For example, Japanese Laid-Open Patent Application No. 2004-260341 discloses an image processing device which includes an image combining unit which superimposes and combines the target image and the image pattern which indicates that copying of the target image is inhibited, and a data output unit which outputs the image data obtained after the combination of the target image and the image pattern, to a predetermined output device.

Also, Japanese Laid-Open patent Application No. 2004-260341 discloses an image processing method for distinguishing a background part and a latent image part of an image. In this image processing method, a ground tint image generating unit generates a set of dots for the latent image part which is expressed with a first number of pixels, and a set of dots for the background part which is expressed with a second number of pixels which number is different from the first number of pixels. A new image is generated in this manner. An additional information unit in the image processing method controls each position of the dot group contained in the latent image part of the image according to the bit value of the bit position corresponding to the additional information.

In addition, the sheet called the forged prevention sheet with which a special printing is performed beforehand is used. On this sheet, the mark (for example, characters, such as "copy inhibition") which indicates that the image of the sheet is a copy of the original image is printed with an optical density that can be reproduced by a copier. On the other hand, the background part of the image is printed with an optical density that is difficult to be reproduced by the copier. The optical densities of the mark part and the background part are provided such that it is difficult for the human eyes to distinguish the mark part and the background part. The mark part and the background part formed in the areas other than the document part of the image are called a "ground tint".

It is demanded that a ground tint is embedded in a document image without spoiling the information on the document as much as possible, and that a ground tint pattern is a pattern which can be distinguished at the time of copying that it is a copy of the original image. And printing of a ground-tint pattern is already realized by the electrophotographic printing method, such as that is used in a laser printer.

In recent years, not only the image forming device using the electrophotographic printing method, but also the image forming device (the ink-jet printing device) using the ink jet printing method in which the liquid ejection head is used as a printing head which carries out ejection of the recording liquid (ink) has been spread.

It is known that the ink-jet printing device uses as the printing head the liquid ejection head. The liquid ejection head comprises a pressure generating unit which generates the pressure which pressurizes the ink of the liquid chamber which communicates with the nozzle which ejects the drop of the ink. The pressure is applied to the ink of the liquid chamber by driving the pressure generating unit of the liquid ejection head in accordance with the image information. A droplet of the ink is ejected from the nozzle, and it is made to adhere to a recording medium, such as a sheet or a film, so that an image is formed on the recording medium (printing).

The dot position and the dot size that which can be formed, and the dot spreading on the recording medium are different between the printing of the ink jet printing method and the printing of the electrophotographic printing method. That is, according to the electrophotographic printing method, the dots can be formed at substantially arbitrary positions. However, according to the ink jet printing method, the dot position that can be formed by the printing head is restricted by the nozzle pitch and the drive frequency of the printing head.

Moreover, according to the electrophotographic printing method, the toner transferred to the recording medium does not permeate the recording medium. However, according to the ink jet printing method, the printing liquid does permeate the recording medium after the ink is ejected to the recording medium, and the dot spreading arises.

Therefore, when performing the printing using the ink-jet printing device which ejects a droplet of the recording liquid and forms an image (printing), there is a problem as to how to perform the printing of an image pattern which indicates that copying of a document image is inhibited.

BRIEF SUMMARY

In an aspect of this disclosure, there is provided an image forming method which performs the printing of an image in which a ground tint is embedded which indicates that copying of the original image is inhibited, by using an ink-jet printing device.

In another aspect, there is provided an ink-jet printing device which performs the printing of an image in which a ground tint is embedded which indicates that copying of the original image is inhibited.

In another aspect, there is provided an image forming method for use with an ink-jet printing device which forms a dot on a recording medium by ejecting a drop of recording liquid, the image forming method comprising the steps of: forming an image in which a ground tint is embedded in one of a foreground part and a background part of an original image, the ground tint indicating that copying of the original image is inhibited; and making a recording liquid adhesion area of the dot per unit area in the foreground part different from a recording liquid adhesion area of the dot per unit area in the background part.

The above-mentioned image forming method may be configured so that a plurality of adjoining dots constitute the ground tint.

The above-mentioned image forming method may be configured so that a plurality of adjoining dots which constitute the ground tint are formed by ejecting a plurality of drops of the recording liquid to a same location on the recording medium.

The above-mentioned image forming method may be configured so that the recording liquid adhesion area of the dot per unit area is varied depending on lightness characteristics of a color of the recording liquid being used.

The above-mentioned image forming method may be configured so that the recording liquid adhesion area of the dot per unit in the background part is larger than the recording liquid adhesion area of the dot per unit area in the foreground part.

The above-mentioned image forming method may be configured so that the recording liquid adhesion area of the dot per unit area in the foreground part is larger than the recording liquid adhesion area of the dot per unit area in the background part.

The above-mentioned image forming method may be configured so that the ink-jet printing device is provided to form a dot of a variable size on the recording medium, and a plurality of adjoining dots constitute the ground tint.

The above-mentioned image forming method may be configured so that the ink-jet printing device is provided to form a dot of a fixed size on the recording medium, and a plurality of adjoining dots constitute the ground tint.

The above-mentioned image forming method may be configured so that the ink-jet printing device is provided to form a dot of a fixed size on the recording medium, and a plurality of adjoining dots which constitute the ground tint are formed by ejecting a plurality of drops of the recording liquid to a same location on the recording medium.

In another aspect of this disclosure, there is provided an ink-jet printing device which forms a dot on a recording medium by ejecting a drop of recording liquid, the ink-jet printing device comprising: a ground-tint pattern creation unit adapted to form an image in which a ground tint is embedded in one of a foreground part and a background part of an original image, the ground tint indicating that copying of the original image is inhibited; and a control unit adapted to make a recording liquid adhesion area of the dot per unit area in the foreground part different from a recording liquid adhesion area of the dot per unit area in the background part.

According to the aforementioned image forming method and ink-jet printing device, when the ink-jet printing device is provided to form a dot of a variable size on the recording medium, an image in which a ground tint is embedded in one of a foreground part and a background part of an original image is formed, and the ground tint indicates that copying of the original image is inhibited, and a recording liquid adhesion area of the dot per unit area in the foreground part is made different from a recording liquid adhesion area of the dot per unit area in the background part. Or when the ink-jet printing device is provided to form a dot of a single fixed size on the recording medium, a plurality of adjoining dots constitute the ground tint. Or when the ink-jet printing device is provided to form a dot of a single fixed size on the recording medium, the plurality of adjoining dots which constitute the ground tint are formed by ejecting a plurality of drops of the recording liquid to a same location on the recording medium. Accordingly, the printing of an image in which a ground tint is embedded which indicates that copying of the original image is inhibited can be performed by using the ink-jet printing device.

Other aspects, features and advantages of will be apparent from the following detailed description when read in conjunction with the accompanying drawings.

DETAILED DESCRIPTION OF PREFERRED EMBODIMENT

A description will now be given of an embodiment of this disclosure with reference to the accompanying drawings.

Figure 1:
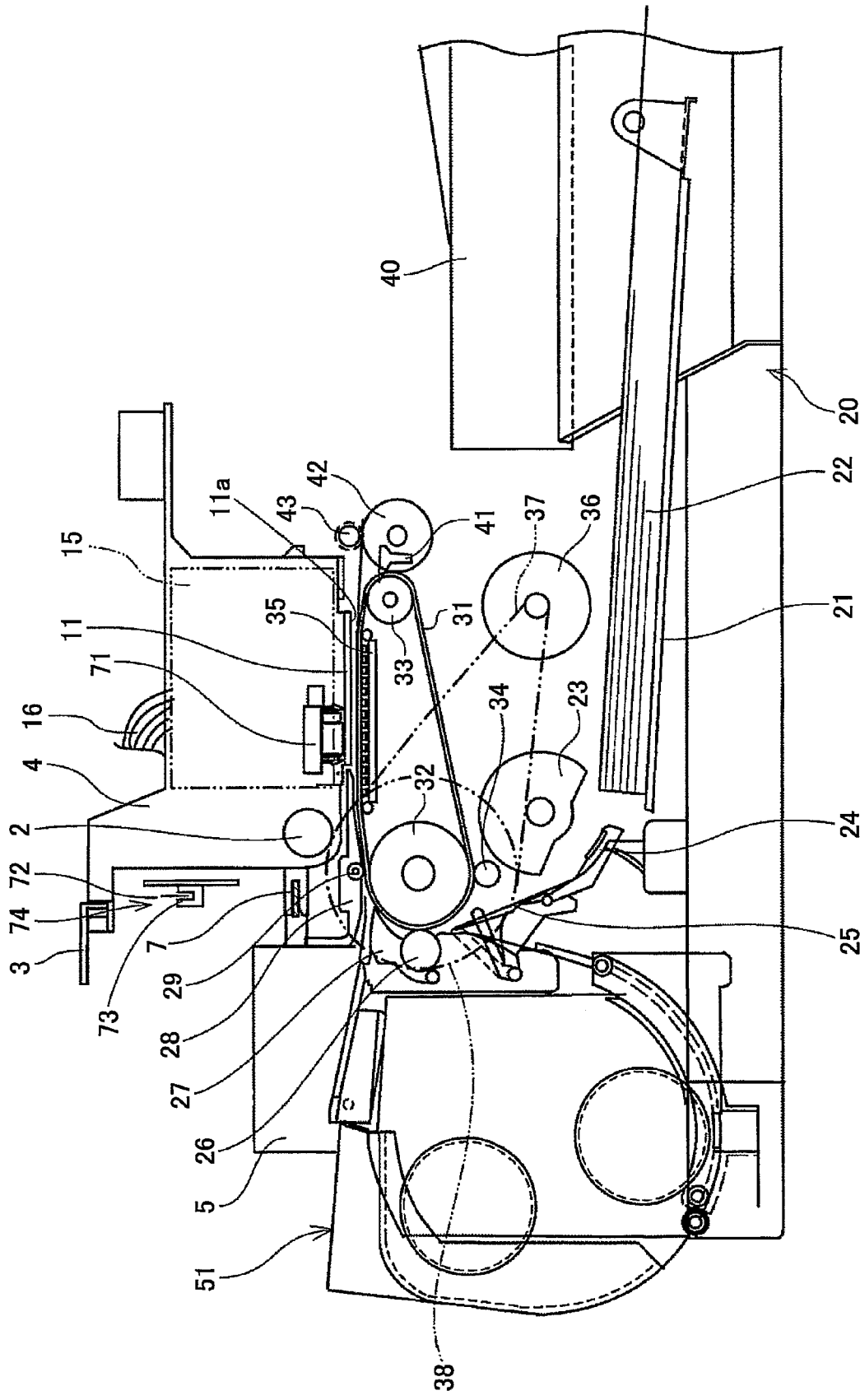
FIG. 1 is a side diagram showing the composition of a mechanism part of an ink-jet printing device which is capable of forming a multi-value dot image.
Figure 2:
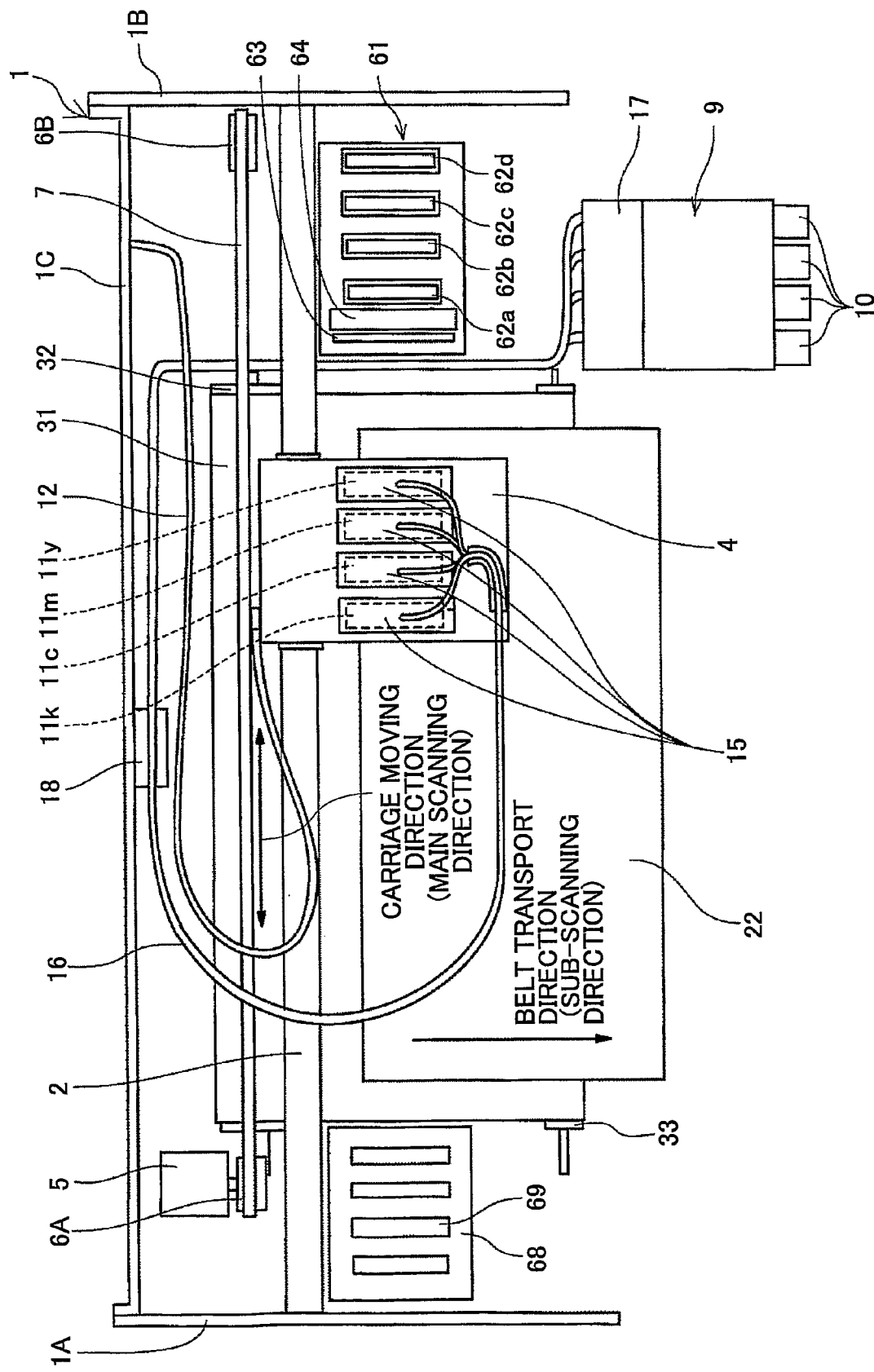
FIG. 2 is a plane diagram showing the composition of the mechanism part of the ink-jet printing device.

An example of a mechanism part of an ink-jet printing device which can form a multi-value dot will be described with reference to FIG. 1 and FIG. 2. FIG. 1 is a side diagram showing the composition of the mechanism part of the ink-jet printing device. FIG. 2 is a plane diagram showing the composition of the mechanism part of the ink-jet printing device.

As shown in FIG. 1 and FIG. 2, in the ink-jet printing device, the carriage 4 is held by the guide rod 2 and the stay 3 which are guide members provided transversely to the side plates 1A and 1B which constitute the frame 1, so that the carriage 4 is moveable in a main scanning direction (the carriage moving direction). The carriage 4 is moved in the direction (main scanning direction) indicated by the arrow in FIG. 2 by the main scan motor 5 through the timing belt 7 which is wound between the driving pulley 6A and the follower belt pulley 6B.

The printing head 11 includes, for example, four liquid ejection heads 11$y$, 11$c$, 11$m$ and 11$k$ each of which ejects the ink drop of each color of yellow (Y), cyan (C), magenta (M) and black (Bk) respectively, and this printing head 11 is provided on the carriage 4. The nozzle sequence of the nozzle surface 11a where the plurality of ink ejection openings (nozzles) are formed for the printing head 11 is arranged in the sub-scanning direction (the belt transport direction) which is perpendicular to the main scanning direction. The ink ejection direction is the downward direction of the printing head 11 in FIG. 1.

Although the liquid ejection head having the independent composition is used in this embodiment, it may be configured to the composition in which one or more printing heads having the plurality of nozzle sequences which carry out ejection of the drop of the recording liquid of each color is used. Moreover, the number and the arrangement order of colors for the printing head are not limited to this embodiment.

The printing head 11 in this embodiment is constituted by the four separate heads 11c, 11m, 11y and 11k which carry out ejection of the ink droplet of each color, and each of the heads 11k, 11c, 11m and 11y is provided with two rows of nozzle sequences in which the plurality of nozzles are provided side by side.

The head which has one or the plurality of nozzle sequences which have arranged the nozzle sequence of two rows of each which carries out ejection of the ink of each color not only to this but to one printing head 11, and which can also constitute and carry out ejection of the black ink, it can also constitute from a head which has one or the plurality of nozzle sequences in each color which carries out ejection of the color ink.

In the ink jet head which constitutes the printing head 11, an energy generating unit for generating the energy to eject the ink is provided. The energy generating unit may be a piezoelectric actuator, such as a piezoelectric element, or a thermal actuator using the phase change by a temperature change by the boiling of a liquid film using an electric thermal conversion element, such as an exothermic resistor.

However, it is preferred that the energy generating unit of this embodiment uses the piezoelectric actuator. In the case of the thermal type using the exothermic resistor for generating air bubbles the pressure generating unit, it is difficult to control the dot size with good accuracy, and the gradation levels must be expressed with the number of dots. On the other hand, in the case of the piezoelectric actuator being used, the amount of displacement of the piezoelectric element is controllable with good accuracy, the size of the dot being formed can be changed greatly and the dot size can express many gradation levels. In this case, to change the diameter of the dot (or to form a multi-value dot), the size of the voltage of a driving pulse, the pulse width of a driving pulse, or the pulse number, etc., is changed. However, this disclosure can be applied to a case in which only the dot of a single size can be formed, which will be described later.

The driver IC (integrated circuit) is provided in the printing head 11, and the driver IC is connected with the control unit (which is not illustrated) through a harness (flexible printed cable or FPC cable) 12.

The sub-tanks 15 of the respective colors for supplying the inks of the respective colors to the printing head 11 are provided in the carriage 4. Supplement supply of the inks of the respective colors to the sub-tanks 15 from the ink cartridges 10 of the respective colors which are attached to the cartridge loading part 9, is carried out through the ink supply tubes 16 of the respective colors. In this cartridge loading part 9, the supply pump unit 17 for feeding the ink in each ink cartridge 10 is formed. The ink supply tubes 16 are held in the middle thereof to the backboard 1C (which constitutes the frame 1) by the locking member 18.

On the other hand, as a sheet feeding unit for feeding the sheets 22 loaded on the sheet loading part (pressure plate) 21 of the sheet feed tray 20, the semi-circular feed roller 23 and the separating pad 24 are provided. The feed roller 23 and the separating pad 24 confront each other and carry out the separation feed of every one sheet of the sheets 22 from the sheet loading part 21. The separating pad 24 is made of the material having a large coefficient of friction, and this separating pad 24 is elastically drawn to the side of the feed roller 23.

In order to feed the sheet 22 from the feeding unit to the lower part side of the printing head 11, the guide member 25, the counter roller 26, the conveyance guide member 27, and the holding member 28 having the front edge pressure roller 29 are provided. And the transport belt 31 is a transport unit for transporting the sheet 22 in the position which counters the printing head 11 while the electrostatic suction of the sheet 22 is performed.

The transport belt 31 is an endless belt, and it is wound between the conveyance roller 32 and the tension roller 33 so that the transport belt 31 is moved circumferentially around them in the belt transport direction (the sub-scanning direction). While the transport belt 31 is moved, it is charged with the charging roller 34 such that the electrostatic suction of the sheet 22 is performed.

The transport belt 31 may be made of a belt of single layer structure or a belt of multiple layer structure. In the case of the transport belt 31 of single layer structure, the whole layer of the belt 31 is formed from an insulating material since the belt 31 contacts the sheet 22 and the charging roller 34. In the case of the transport belt 31 of multiple layer structure, it is preferred that the side of the belt 31 which is in contact with the sheet 22 and the charging roller 34 is formed from an insulating material and the side of the belt 31 which is not in contact with the sheet 22 or the charging roller 34 is formed from a conductive material.

It is preferred that the insulating material which forms the transport belt 31 of one-layer structure, or the insulating material which forms the insulating layer of the transport belt 31 of multiple layer structure does not contain an electric conduction control material. Examples of the insulating material may include a resin or an elastomer, such as PET, PEI, PVDF, PC, ETFE, PTFE. The volume resistivity is more than 1012 ohm-cm, and it is desirably 1015 ohm-cm.

It is preferred to form the conductive layer of the transport belt 31 of multiple layer structure from a conductive material with which the resin or the elastomer may be made to contain carbon. The volume resistivity is in a range of 105-107 ohm-cm.

The charging roller 34 is provided to contact the insulating layer (in the case of the belt of multiple layer structure) which forms the surface of the transport belt 31, and it is arranged so that the charging roller 34 may follow and be rotated in accordance with the rotation of the transport belt 31. And pressure is applied to the charging roller 34 at the both ends of the shaft thereof.

The charging roller 34 is formed from a conductive member the volume resistivity of which is in a range of 106-109 ohms/□. The AC bias voltage (high voltage) of 2 kV positive/negative polarities is applied to the charging roller 34 from the AC bias supply unit (the high voltage power supply) which will be described later. Although a sine waveform and a triangular waveform may be used for this AC bias voltage, it is preferred to use a square waveform for the AC bias voltage.

On the back side of the transport belt 31, the guide member 35 is arranged at the position corresponding to the printing range by the printing head 11. The guide member 35 is arranged to project toward the printing head 11 from the tangent line between the two rollers (conveyance roller 32 and tension roller 33) the upper surface of which supports the transport belt 31, in order to maintain the highly accurate flatness of the transport belt 31.

The circumferential movement of the transport belt 31 is performed in the belt transport direction of FIG. 2, when the conveyance roller 32 is rotated through the drive belt 37 and the timing roller 38 by the sub-scan motor 36. Although not illustrated, the encoder wheel in which the slit is formed is attached to the shaft of the conveyance roller 32, the transmission type photosensor which detects the slit of the encoder wheel is provided. The encoder wheel and the photosensor constitute the wheel encoder.

Moreover, the separation pawl 41 for separating the sheet 22 from the transport belt 31, the delivery roller 42 and the delivery roller 43 are provided as a sheet ejection unit for delivering the sheet 22 in which an image is recorded by the printing head 11, to the sheet ejection tray 40.

On the back side of the frame 1, the double-sided copying unit 51 is detachably attached. The double-sided copying unit 51 captures the sheet 22 which is returned by the reversal rotation of the transport belt 31 in the opposite direction, reverses the sheet 22, and feeds again the sheet 22 to the position between the counter roller 26 and the transport belt 31. The manual bypass tray 52 is provided on the upper surface of the double-sided copying unit 51.

The maintenance recovery mechanism 61 for maintaining and recovering the state of each nozzle of the printing head 11 is arranged in the non-printing area in one of the scanning directions of the carriage 4. In the maintenance recovery mechanism 61, there are provided the cap members (or caps) 62a-62d (which are collectively called "cap 62" when not distinguishing) for capping each of the nozzle surfaces 11a of the printing head 11, the wiper blade 63 which is a blade member for carrying out wiping of the nozzle surfaces 11a, and the dummy ejection receptacle 64 which receives the ink which does not contribute to printing and ejects such ink when performing the dummy ejection, in order to eject the thickened recording liquid drop. The cap 62a is provided for suction the ink and moisturizing the nozzle surface, and the other caps 62b-62d are provided for moisturizing the nozzle surface.

The dummy ejection receptacle 68 is provided in the non-printing area on the other side of the carriage 4 opposite to the main scanning direction. The dummy ejection receptacle 68 receives the ink the ink which does not contribute to the liquid ejection when performing the dummy ejection to eject the thickened recording liquid at the time of printing. And the dummy ejection receptacle 68 is provided with the openings 69 arrayed along the nozzle column direction of the printing head 11.

As shown in FIG. 1, the optical density sensor 71 (which is a recording medium detection unit for detecting existence of the sheet 22) which is made of an infrared sensor (the kind of sensor is not limited to this infrared sensor) is provided in the carriage 4. The optical density sensor 71 is arranged at an upstream position of the printing head 11 in the sheet transport direction which is located in the image forming range (or the transport belt 31 side) when the carriage 4 is in a home position.

The encoder scale 72 in which the slit is formed is provided on the front side of the carriage 4 along the main scanning direction. The encoder sensor 73 which is formed from a transmission type photosensor which detects the slit of the encoder scale 72 is provided on the front side of the carriage 4. And the encoder scale 72 and the encoder sensor 73 constitute the linear encoder 74 which detects the position of the carriage 4 in the main scanning direction.

Next, an example of the liquid ejection head which constitutes the printing head in the ink-jet printing device will be described with reference to FIG. 3 and FIG. 4.

Figure 3:
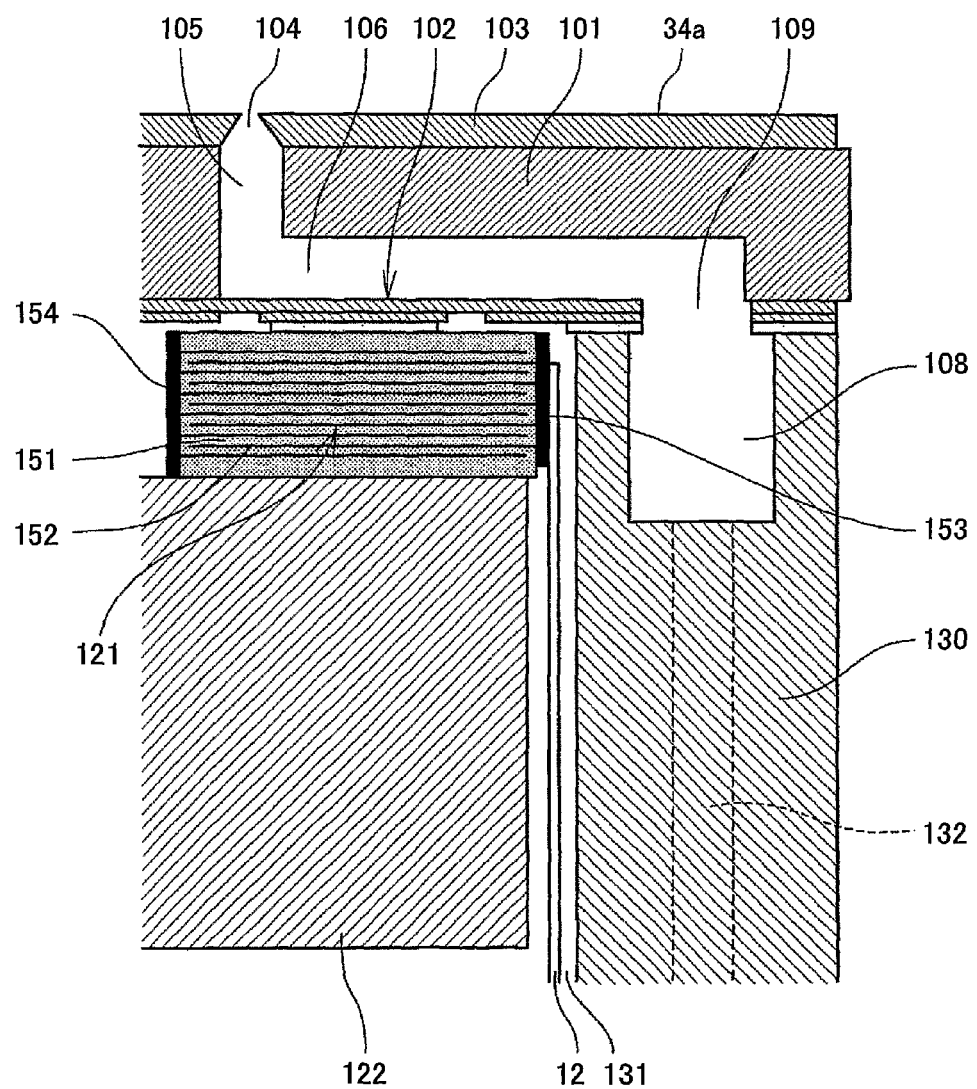
FIG. 3 is a cross-sectional diagram showing the composition of a liquid ejection head taken along the longitudinal direction of a liquid chamber.
Figure 4:
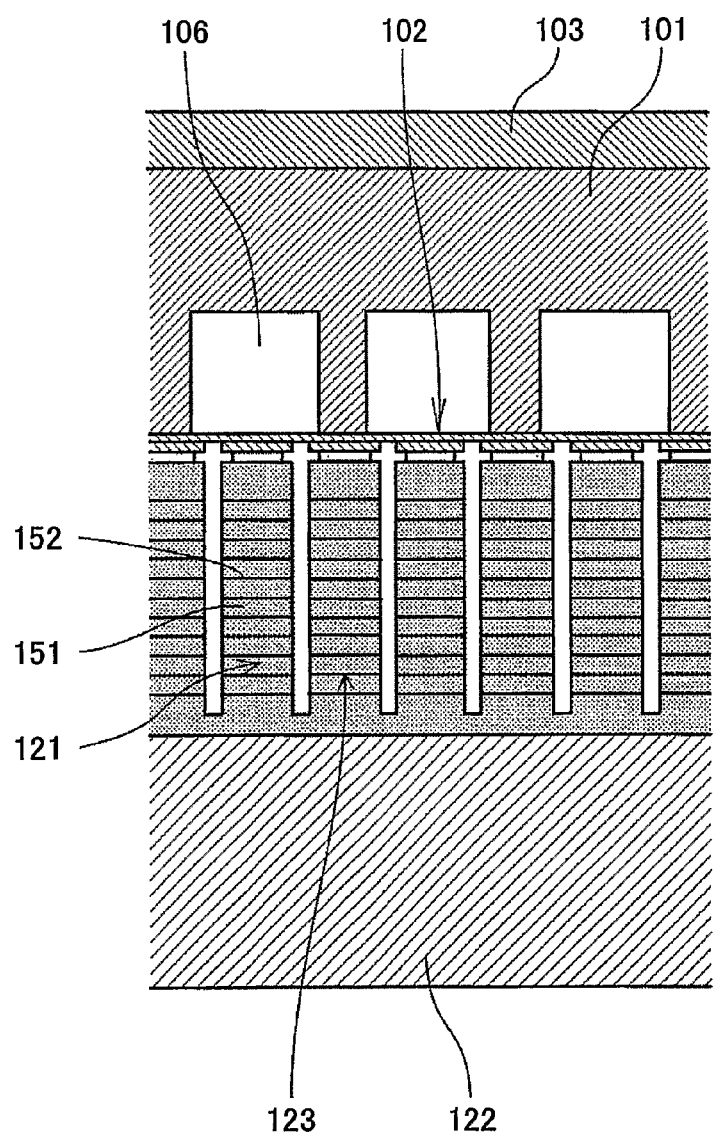
FIG. 4 is a cross-sectional diagram showing the composition of the liquid ejection head taken along the transverse direction of the liquid chamber.

FIG. 3 is a cross-sectional diagram of the liquid ejection head taken along the longitudinal direction of the liquid chamber of this head. FIG. 4 is a cross-sectional diagram of the liquid ejection head taken along the transverse direction of the liquid chamber of this head (the nozzle array direction).

The liquid ejection head comprises a channel plate 101 which is formed by performing the anisotropic etching of a mono-crystal silicon substrate, a diaphragm 102 which is formed by the nickel electro-casting bonded to the undersurface of the channel plate 101, and a nozzle plate 103 which is bonded to the upper surface of the channel plate 101. These elements are joined together and laminated.

Thereby, a nozzle communicating path 105, a liquid chamber 106, a common liquid chamber 108, and an ink supplying port 109 are formed. The nozzle 104 which ejects the ink (ink drop) communicates with the liquid chamber 106 and the common liquid chamber 108. The common liquid chamber 108 is provided for supplying the ink to the nozzle communicating path 105 and the liquid chamber 106, and the ink supplying port 109 communicates with the common liquid chamber 108.

The laminated type piezoelectric elements 121 of two rows are provided as an electromechanical transducer which is a pressure generating unit (actuator unit) for deflecting the diaphragm 102 and pressurizing the ink in the liquid chamber 106. And the base substrate 122 is provided to fix the piezoelectric elements 121 to the base substrate 122 by bonding. The support units 123 are formed between the piezoelectric elements 121. The support units 123 are formed simultaneously with the piezoelectric element 121 by carrying out the division processing of the piezoelectric element material. The support units 123 do not receive the driving voltage, and they serve as the supporting members.

The FPC cable 12 in which the drive circuit (drive IC) which is not illustrated is installed is connected to the piezoelectric elements 121.

And the frame member 130 and the peripheral part of the diaphragm 102 are joined together. In the frame member 130, the concave portion is formed such that the concave portion is used to form the insertion portion 131 and the common liquid chamber 108. The actuator unit which comprises the piezoelectric element 121 and the base substrate 122 is inserted in the insertion portion 131. Also, in the frame member 130, the ink supply hole 132 is formed, and the ink supply hole 132 is used for externally supplying the ink to the common liquid chamber 108. For example, the frame member 130 is formed by injection molding of a thermosetting resin, such as epoxy resin, or polyphenylene sulfite.

In the present example, the channel plate 101 is formed by anisotropic etching of a mono-crystal silicon substrate with the crystalline orientation (110), using an alkaline etching solution, such as a potassium hydroxide solution (KOH). Thereby, the concave portion which is used as the nozzle communicating path 105 and the liquid chamber 106, and the hole portion are formed. However, this disclosure is not limited to the mono-crystal silicon substrate. Alternatively, a stainless steel substrate, a photosensitive resin, etc. may used instead.

In the present example, the diaphragm 102 is formed from the metal plate of nickel and prepared by the electroforming method. Alternatively, another metal plate or a combined member of a metal plate and a resin plate may be used instead.

The piezoelectric element 121 and the support unit 123 are bonded to the diaphragm 102 by the adhesive agent, and the frame member 130 is further bonded to the diaphragm 102 by the adhesive agent.

In the nozzle plate 103, the nozzles 104 each having the diameter in a range of 10-30 micrometers and corresponding to each of the liquid chambers 106, are formed. The nozzle plate 103 is bonded to the channel plate 101 by the adhesive agent. The nozzle plate 103 is provided so that a given layer is formed on the surface of the nozzle formation member which is made of a metal member, and a water-repellent layer on the top of the surface of the given layer. The surface of the nozzle plate 103 forms the above-mentioned nozzle surface 34a.

The piezoelectric elements 121 are the laminated type piezoelectric elements (PZT) in which piezoelectric materials 151 and internal electrodes 152 are laminated alternately. The individual electrode 153 and the common electrode 154 are connected to each of the internal electrodes 152 which are pulled out to the respective end faces of the piezoelectric elements 121.

In the present example, the piezoelectric elements 121 have the composition in which the ink in the liquid chamber 106 is pressurized using the displacement in the d33 direction as the direction of piezoelectricity of the piezoelectric elements 121. Alternatively, the composition in which the ink in the liquid chamber 106 is pressurized using the displacement in the d31 direction as the direction of piezoelectricity of the piezoelectric elements 121 may be used.

Moreover, the structure in which the piezoelectric elements 121 of one row are provided on a single substrate 122 may be used.

In the above-described liquid ejection head, the voltage applied to the piezoelectric element 121 is dropped to be lower than the reference electric potential, the piezoelectric element 121 contracts and the diaphragm 102 descends so that the volume of the liquid chamber 106 expands and the ink flows into the liquid chamber 106. And the voltage applied to piezoelectric element 121 is increased, and the piezoelectric element 121 is elongated in the lamination direction. The diaphragm 102 is deflected in the nozzle 104 direction, and the volume of the liquid chamber 106 is shrunk, so that the ink in the liquid chamber 106 is pressurized and the drop of the ink (recording liquid) is ejected from the nozzle 104.

By returning the voltage applied to the piezoelectric element 121 to the reference electric potential, the diaphragm 102 returned to the initial position, and the liquid chamber 106 expands so that a negative pressure occurs in the liquid chamber 106. At this time, the liquid chamber 106 is filled up with the recording liquid from the common liquid chamber 108.

Then, the vibration of the meniscus surface of the nozzle 104 is declined and stabilized, the operation of the liquid ejection head is shifted to the operation for ejection of the following drop.

The drive method of the liquid ejection head is not limited to the above-mentioned example. Another drive method (pushing and striking) may be used instead.

In the ink-jet printing device mentioned above, the separation feeding of one sheet of the sheets 22 from the sheet feeding unit is carried out, and the upwardly fed sheet 22 is guided by the guide 25. The sheet 22 is inserted between the transport belt 31 and the counter roller 26, and it is conveyed. The front edge of the sheet 22 is guided by the conveyance guide 27, and the sheet 22 is pushed against the transport belt 31 by the edge pressure roller 29 so that the sheet 22 is transported in the sheet transport direction by about 90 degrees.

At this time, the voltage of the positive electric potential and the voltage of the negative electric potential are alternately supplied from the AC bias supply unit to the charging roller 34. Namely, the alternately changing voltage is supplied to the transport belt 31 via the charging roller 34. The belt-like alternate regions which are charged positively and negatively in the charging voltage pattern of a predetermined width are present in the transport belt 31.

When the sheet 22 is carried on the transport belt 31 which is charged alternately with the positive and negative polarities, the sheet 22 is sucked up by the transport belt 31 by the electrostatic force, and the sheet 22 is conveyed in the sub-scanning direction by the circumferential movement of the transport belt 31.

Then, the printing head 11 is driven according to an image signal while the carriage 4 is moved, and the ink drops are ejected to the stopped sheet 22 so that one line of an image is formed on the sheet 22. After the sheet 22 is conveyed by a given conveyance amount, the following line of the image is formed on the sheet 22.

When the print end signal is received or when a detection signal indicating that the rear end of the sheet 22 reaches the image formation range is received, the printing operation is terminated. The sheet 2 is then delivered to the sheet ejection tray 40.

In the case of double-sided printing, the transport belt 31 is reversely rotated when the printing of the front surface of the sheet 22 is completed, the sheet 22 in which the image is formed on the front surface is sent to the double-sided printing unit 51. The sheet 22 is reversed (in the state where the back surface is changed to a printing surface), and the sheet 22 is fed to the position between the counter roller 26 and the transport belt 31 again.

After conveying of the sheet 22 is performed by the transport belt 31 through the timing control, the image is formed on the back surface of the sheet 22. Then, the sheet 22 is delivered to the sheet ejection tray 40.

When an image in which a ground tint is embedded which indicates that copying of the document is inhibited is printed on a sheet by using the above-described ink-jet printing device, there is a problem that the ink dot adhering to the sheet permeates along with the fibers of the sheet, which is specific to the ink-jet printing. In order to realize the ground tint printing, it is preferred to use the ink which lessens the spreading and feathering of the ink dot as much as possible.

The ink which is used by the above-described ink-jet printing device is prepared to contain the following components (1) to (10). And the pigment is used as a colorant for printing, and the solvent for decomposing and distributing the pigment is used as essential ingredients. Moreover, the wetting agent, the surface active agent, the emulsion, the antiseptics, and the pH adjuster are further used as additives. The purposes of mixing the wetting agent 1 and the wetting agent 2 are to make the viscosity control easily and to harness the features of the wetting agents respectively.

(1) pigment (self-dispersibility pigment) 6 wt % or more
(2) wetting agent 1
(3) wetting agent 2
(4) water soluble organic solvent
(5) anionic or nonionic surface active agent
(6) polyol or glycol ether with the carbon number of eight or more
(7) emulsion
(8) antiseptics
(9) pH adjuster
(10) pure water The ink used by the above ink-jet printing device contains the above-mentioned components (1) to (10). When an image is printed on a plain sheet with the above-mentioned ink, a high image density, a clear quality of image which does not cause a feathering phenomenon of the characters and the image, and a good color tone (sufficient coloring characteristics and color reproduction characteristics) can be obtained. Thus, when the printing of an image in which a ground tint is embedded is performed, the dots of the ground tint (the background part and the mark part which indicates that it is a copy) can be clearly reproduced. It is possible to prevent the mark part from becoming blurred or prevent occurrence of a natural complexion soil in the background part due to the difference in reproducibility according to dot size.

Next, the composition of the control unit of this ink-jet printing device will be described with reference to FIG. 5.

Figure 5:
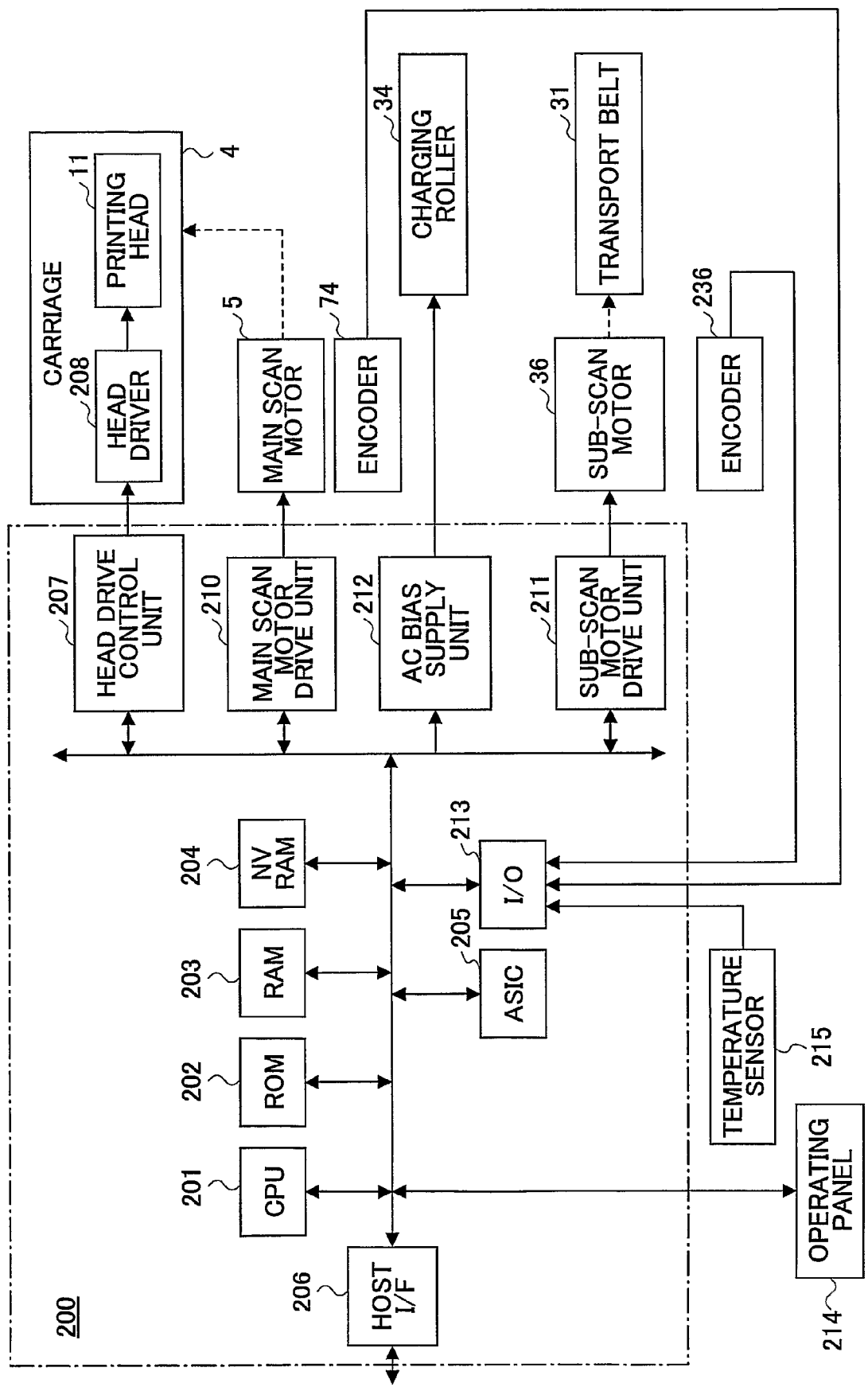
FIG. 5 is a block diagram showing the composition of a control unit of the ink-jet printing device.

As shown in FIG. 5, the control unit 200 comprises a CPU 211 which manages control of the whole ink-jet printing device, a ROM 202 which store the program executed by the CPU 211 and other fixed data, a RAM 203 which temporarily stores image data or the like, a rewritable nonvolatile memory 204 which holds data to be written even when the power supply of the device is turned off, and an ASIC 205 which performs various signal processing of image data, rearrangement processing of the image data, and processing of input/output signals for controlling the whole device.

Moreover, the control unit 200 comprises a host interface (I/F) 206, a head drive control unit 207, a head driver (driver IC) 208, a main-scan motor drive unit 210, a sub-scan motor drive unit 211, an AC bias supply unit 212, and an I/O interface 213. The host I/F 206 is provided to transmit or receive the data and the signals to or from the host system. The head drive control unit 207 includes the data transfer unit which is provided to carry out drive control of the printing head 11. The printing head 11 and the head driver 208 are provided on the side of the carriage 4. The head driver 208 is a head driving device which is provided to drive the printing head 11.

The main-scan motor drive unit 210 is provided to drive the main scan motor 5. The sub-scan motor drive unit 211 is provided to drive the sub-scan motor 36. The AC bias supply unit 212 is provided to supply the AC bias to the charging roller 34. The I/O interface 213 is provided for inputting the detection pulses from the linear encoder 74 and the wheel encoder 236, the detection signal from the temperature sensor 215 which detects environmental temperature, and the detection signal from other various sensors.

An operation panel 214 is also connected to the control unit 200, and this operation panel 214 is provided for inputting and displaying of operational information needed for the ink-jet printing device.

The control unit 200 receives the printing data including the image data from the host system including an imaging device, such as a digital camera, an image reader, such as an image sensor, and a data processing device, such as a personal computer etc. via the cable or the network by using the host I/F 206.

And the CPU 201 of the control unit 200 reads and analyzes the printing data in the receiving buffer contained in the host I/F 206, causes the ASIC 205 to perform the required image processing and rearrangement processing of the printing data, and transmits the image data from the head drive control unit 207 to the head driver 208. Creation of the dot pattern data for carrying out the image output may be performed by storing the font data in the ROM 202. Or it may be performed by developing the image data to the bitmap data using the printer driver on the host system side and transmitting the bitmap data to the control unit 200.

The head drive control unit 207 transmits the above-mentioned image data as the serial data, and outputs the transmission clock and latch signal needed for transmission of the image data and for determination of the transmission, and the control signal, to the head driver 208. Moreover, the head drive control unit 207 includes the drive waveform creation unit which comprises a D-A converter and an amplifier etc. which perform D/A conversion of the pattern data of the driving pulse which is stored in the ROM 202 and read out by the CPU 201. The drive waveform creation unit of the head drive control unit 207 creates the drive waveform which is constituted by one or the plurality of driving pulses (the driving signal), and outputs the drive waveform to the head driver 208.

The head driver 208 includes a shift register which receives the clock signal and the serial data (which are the image data from the head drive control unit 207), a latch circuit which latches the registration value of the shift register by the latch signal from the head drive control unit 107, a level conversion circuit (level shifter) which carries out level conversion of the output value of the latch circuit, and an analog switch array (switching unit) the ON/OFF state of which is controlled by the level shifter. The head driver 108 controls the ON/OFF state of the analog switch array, and selectively applies the driving pulses contained in the drive waveform from the head drive control unit 207, to the actuator unit (the piezoelectric element 121) of the printing head 11 so that the printing head 11 is driven.

The main-scan motor drive unit 210 computes a control value based on the speed detection value which is acquired by sampling of the detection pulse from the linear encoder 74 and the target value from the CPU 201 side, and drives the main scan motor 5 through the internal motor driver.

Similarly, the sub-scan motor drive control unit 211 computes a control value based on the speed detection value which is acquired by sampling of the detection pulse from the wheel encoder 136 and the target value from the CPU 101 side, and drives the sub-scan motor 36 through the internal motor driver.

Figure 6:
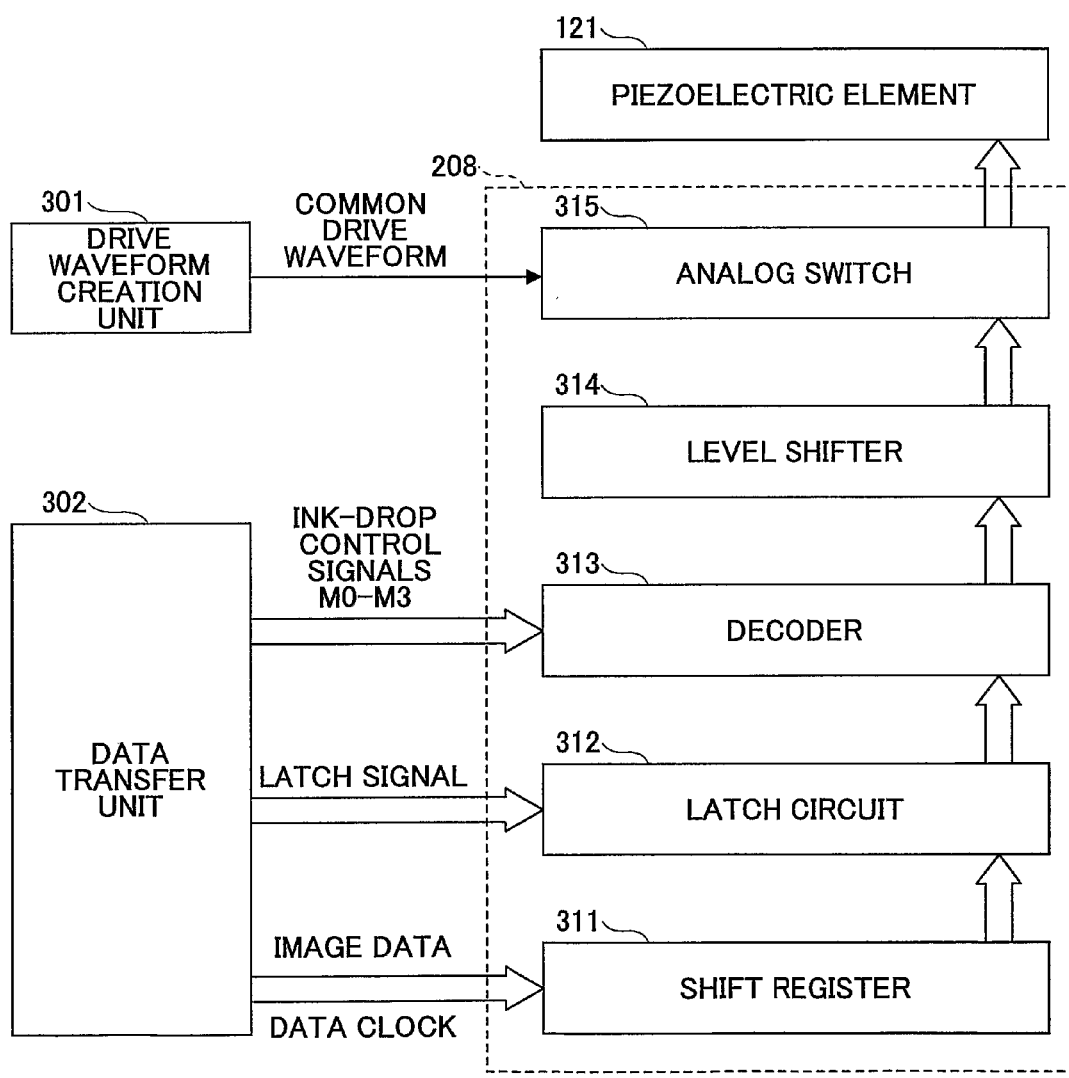
FIG. 6 is a block diagram showing the composition of a head control unit and a head driver in the control unit.

Next, an example of the composition of the head drive control unit 207 and the head driver 28 will be described with reference to FIG. 6.

The head drive control unit 207 is provided with the following units 301 and 302. The driving waveform generating unit 301 generates and outputs the driving waveform (common driving waveform) which includes the plurality of driving pulses (driving signals) in one ejection period. The data transfer unit 302 outputs the image data (printing data), the transmission clock, the latch signal, and the drop control signals. The drop control signals M0-M3 are to instruct, for every drop, the opening/closing state of the analog switch 315 of the head driver 208. In accordance with the ejection period of the common driving waveform, the state of each drop control signal is changed to H level by the waveform to be chosen, and the state of each drop control signal is changed to L level at the time of non-selection.

The head driver 208 is provided with the following units 311 through 315. The shift register 311 inputs the transmission clock (shift clock) and the serial image data from the data transfer unit 302. The latch circuit 312 latches each registration value of the shift register 311 with the latch signal. The decoder 313 decodes the image data and the drop control signals M0-M3 and outputs the resulting signals. The analog switch 315 is turned ON or OFF (closed or opened) in accordance with the output of the decoder 313 received through the level shifter 314. The level shifter 314 converts the level of the logic level voltage signal of the decoder 313 into the level that the analog switch 315 can operate.

The analog switch 315 is connected to the selection electrode (individual electrode) 154 of each piezoelectric element 121, and the common driving waveform is inputted from the driving waveform generating unit 301 to the analog switch 315. Therefore, the analog switch 316 is turned ON in accordance with the output data of the decoder 313 which decodes the image data transferred serially and the control signal, and the necessary driving signal which constitutes the common driving waveform is passed (selected) so that it is applied to the piezoelectric element 121.

Figure 7:
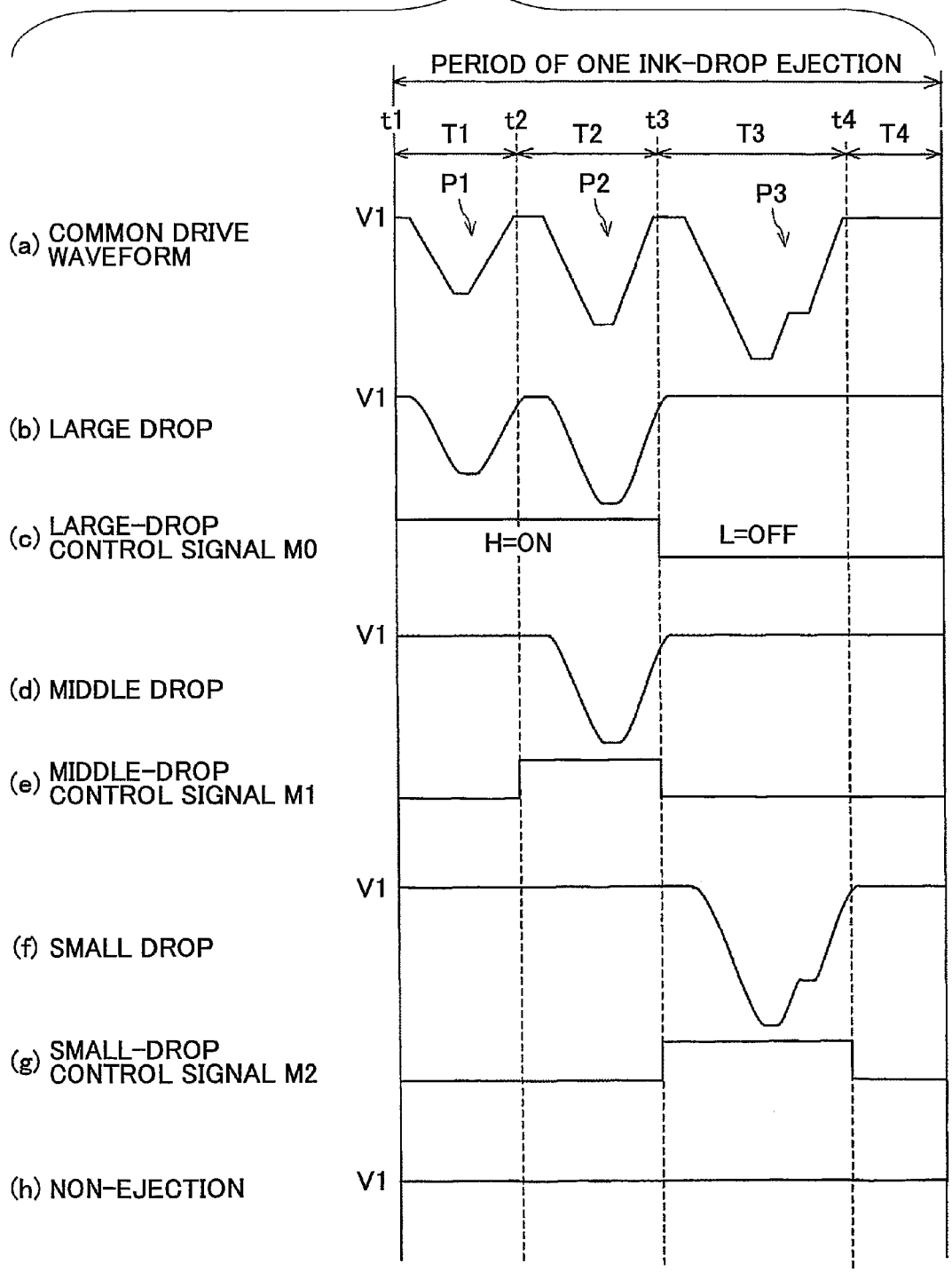
FIG. 7 is a diagram for explaining operation of the head control unit and the head driver.

Next, the operation of the head driver 208 will be described also with reference to FIG. 7.

As shown in FIG. 7(a), the driving waveform generating unit 301 outputs the common driving waveform containing the plurality of pulses (driving signals) P1, P2 and P3. In the period of one ink-drop ejection, this waveform falls from the reference electric potential (the middle electric potential) V1 (in the direction to expand the liquid chamber volume), and after a predetermined hold time is passed, the waveform rises to the reference electric potential V1 (in the direction to contract the liquid chamber volume).

A large drop is formed by ejecting the two drops by the pulse signal P1 and the pulse signal P2 and combining them into one drop during the flight. A middle drop is formed only by the pulse signal P2 because the falling electric potential of the wave element of the pulse signal P2 is made lower than that the pulse signal P1. The falling electric potential of the wave element of the pulse signal P3 is made lower than that of the pulse signal P2 and the waveform is made to rise gradually, and a small drop is formed only by the pulse signal P3.

When a large drop is selected, the driving waveform generating unit 301 outputs the large drop control signal M0 in which the portions T1 and T2 corresponding to the pulses P1 and P2 are set to H level as shown in FIGS. 7(b) and (c). When a middle drop is selected, the driving waveform generating unit 301 outputs the middle drop control signal M1 in which the portion T2 corresponding to the pulse P2 is set to H level as shown in FIGS. 7(d) and (e). When a small drop is selected, the driving waveform generating unit 301 outputs the small drop control signal M2 in which the portion T3 is set to H level as shown in FIGS. 7(f) and (g). When no ejection of dots is selected, the voltage V1 is maintained as shown in FIG. 7(h).

Therefore, according to the image data transmitted from the data transfer unit 302, a large drop, a middle drop, a small drop, and non-ejection can be chosen. Hence, the four gradation levels of the image can be formed according to the multiple-value dots having the sizes including the large dot, the middle dot, the small dot and the non-ejection.

In the ink-jet printing device, the program of this disclosure which performs the procedure of performing the image forming method of this disclosure for outputting a printing image including the ground tint which indicates that copying of a document is inhibited is stored.

Figure 8:
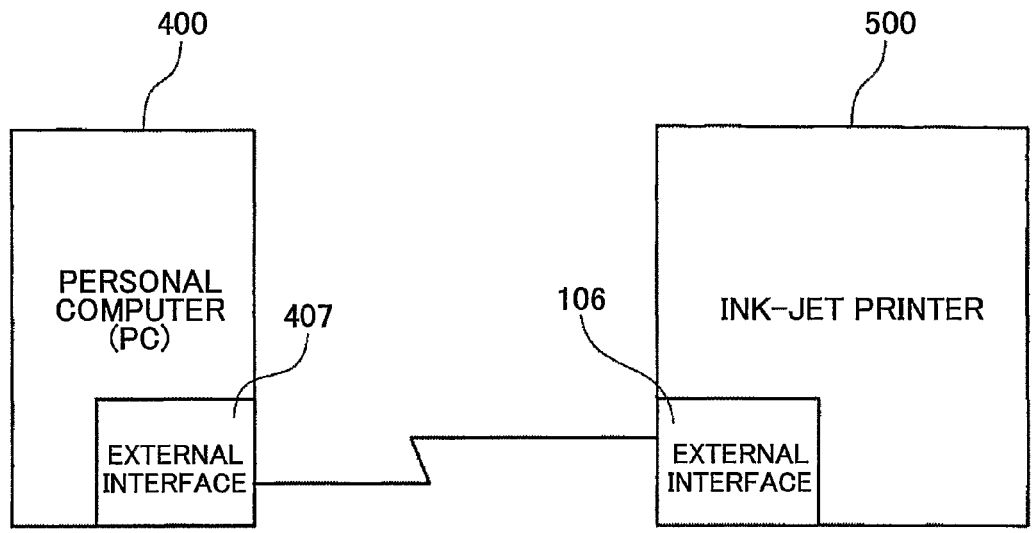
FIG. 8 is a block diagram showing the composition of a printing system including an image processing device and an ink-jet printing device.

FIG. 8 is a block diagram showing the composition of a printing system including an image processing device and the ink-jet printer which is the above-described ink-jet printing device of this disclosure.

One or the plurality of image processing devices 400 which are personal computers (PC), and the ink-jet printer 500 are connected by a predetermined interface or a predetermined network, so that the printing system (image forming system) is constituted.

Figure 9:
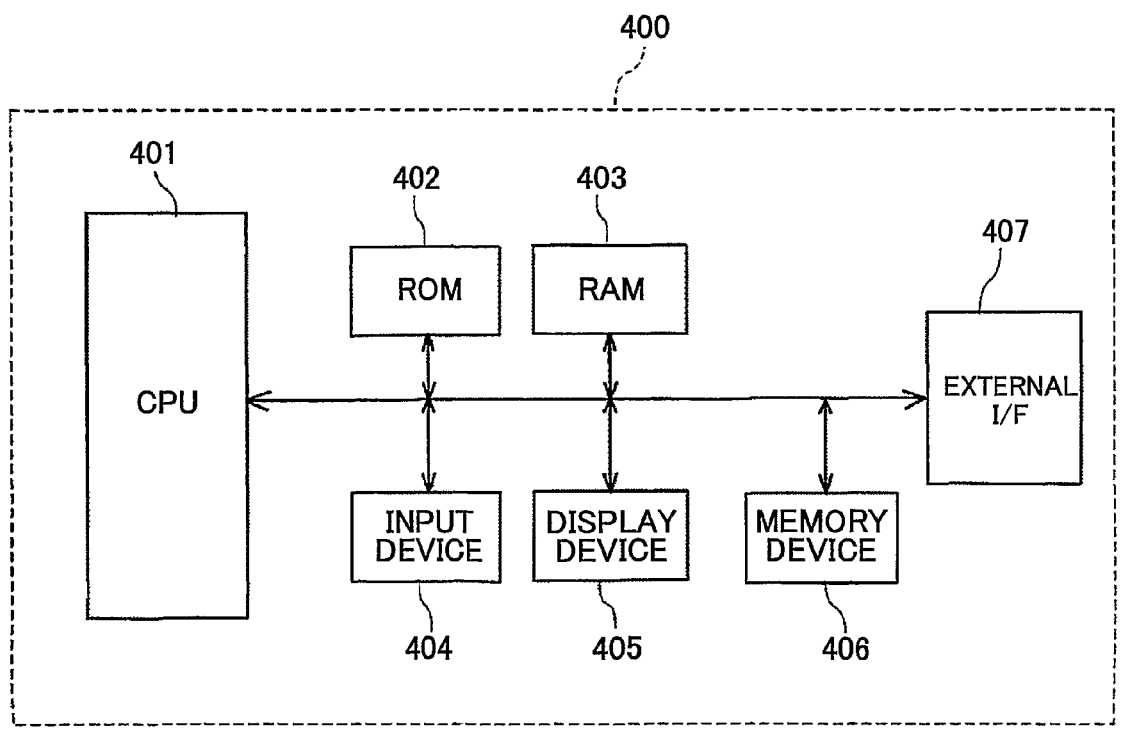
FIG. 9 is a block diagram showing the composition of the image processing device.

As the image processing device 400 is shown in FIG. 9, the CPU 401, and various kinds of the ROM 402 and the RAM 403 which are memory unit are connected by the bus line. The memory 406 using magnetic storage devices, such as a hard disk, via the interface predetermined to this bus line. The input device 404, such as a mouse or a keyboard, and the display device 405, such as LCD and CRT, although not illustrated, predetermined interface (external I/F) 407 which the storage-medium reader which reads storage media, such as an optical disc, is connected, and communicates with external instruments, such as networks, such as the Internet, and USB, is connected.

The image-processing program which includes the program of this disclosure in memory 406 of image processing device 400 is memorized. This image-processing program is read in a storage medium with a storage-medium reader, or is downloaded from networks, such as the Internet, and is installed in memory 406.

It will be in the state where it can operate in order that image processing device 400 may perform the following image processing by this installation.

This image-processing program may operate on predetermined OS. A part of specific the application program may be made.

Figure 10:
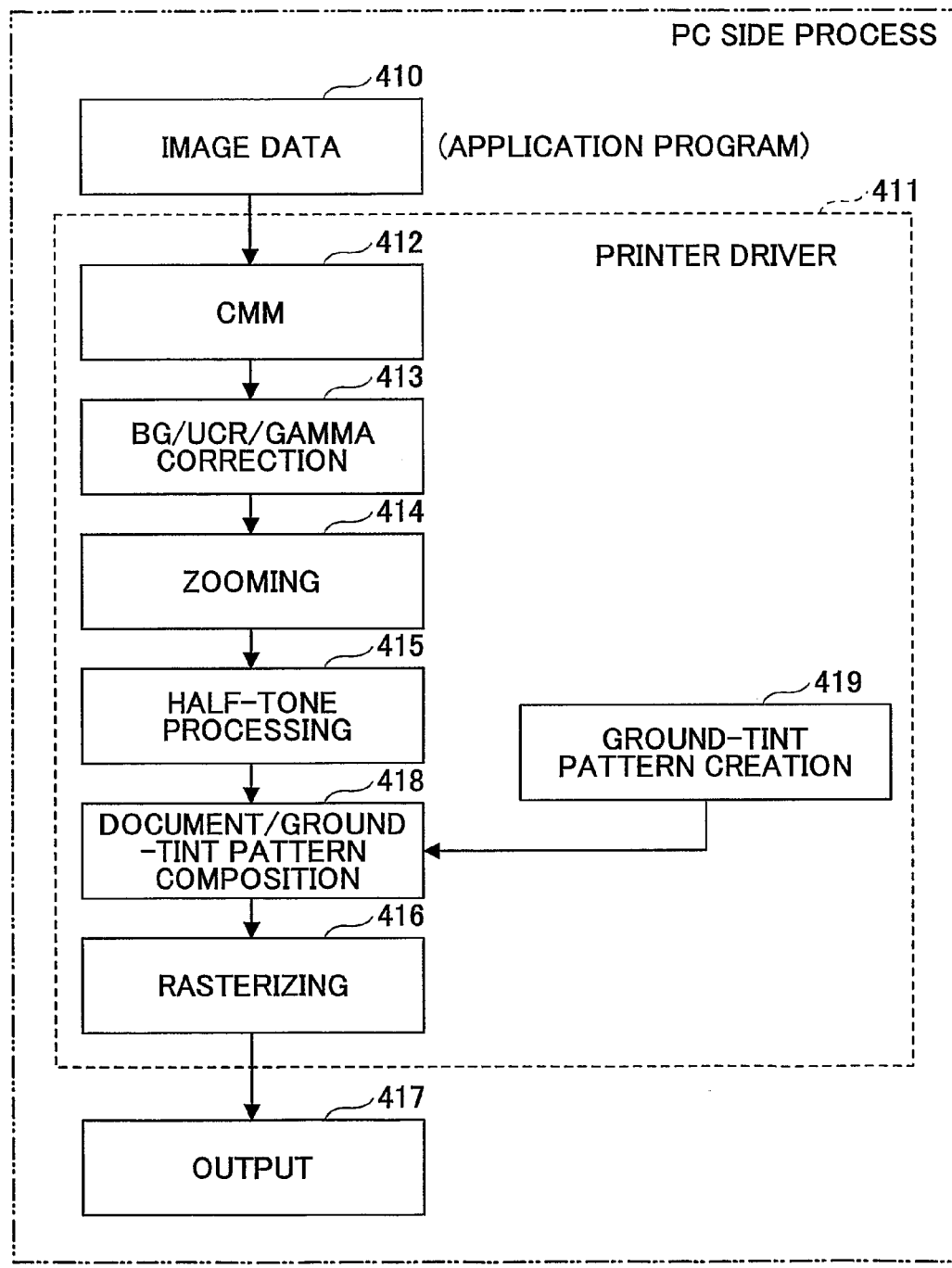
FIG. 10 is a block diagram for explaining the functional composition of an image processing program in the printing system.

The program by the side of image processing device 400 explains the example which performs the image processing method of this disclosure with reference to the functional block diagram of FIG. 10.

This is a case where almost all image processing is performed with a host computer like PC as an image processing device, and is the composition of being suitably used with the ink-jet printing device of the comparatively low-cost device.

The printer driver 411 which is a program of this disclosure by the side of image processing device 400 (PC), and the image data 411 given from the application program etc. CMM (Color Management Module) processing unit 412 which performs conversion (RGB color coordinates->CMY color system) to the color space for recording equipments from the color space for the display monitor, BG/UCR which performs black generation/lower color removal from the value of CMY (black).

According to the resolution of the BG/UCR/gamma correction 413 to perform and recording equipment, the gamma correction which performs the input/output compensation reflecting the characteristics of black generation/under color removal processing and recording equipment, or the user's selected expansion processing, a zooming unit 414 and image data to perform the dot pattern data which is the print image data obtained from the half tone processing unit (multiple value and few value matrix) 415 containing the multiple value and few value matrix replaced with pattern arrangement of the dot injected from recording equipment, and the document/ground-tint pattern composition unit 418, it is divided into the data for every scan, and the rasterizing unit 416 which carries out data development according to each nozzle location which records further is included, the output 417 of the rasterizing unit 416 is sent out to the ink-jet printer 500.

In the printer driver, the document image data outputted from the half tone processing unit 415 which performed image processing in the original image (called "document image") indicated by the image data 410 mentioned above, and is converted into the data according to the dot of the multiple values in which an output is possible with ink-jet printing device 500, it has the document and ground-tint pattern composition unit 418 as a unit to superimpose and compound the data of the image pattern (henceforth a "ground-tint pattern") in which it is shown that it is a document copying of which is inhibited is generated by the ground-tint pattern creation unit 419.

By combining the document image data and the data of a ground-tint pattern according to the dots of the multiple values in which the output is possible with the ink-jet printer 500 by this document and ground-tint pattern composition unit 418, the ink-jet printer 500 generates the print image data according to the dots of the multiple values in which an output is possible.

Figure 11:
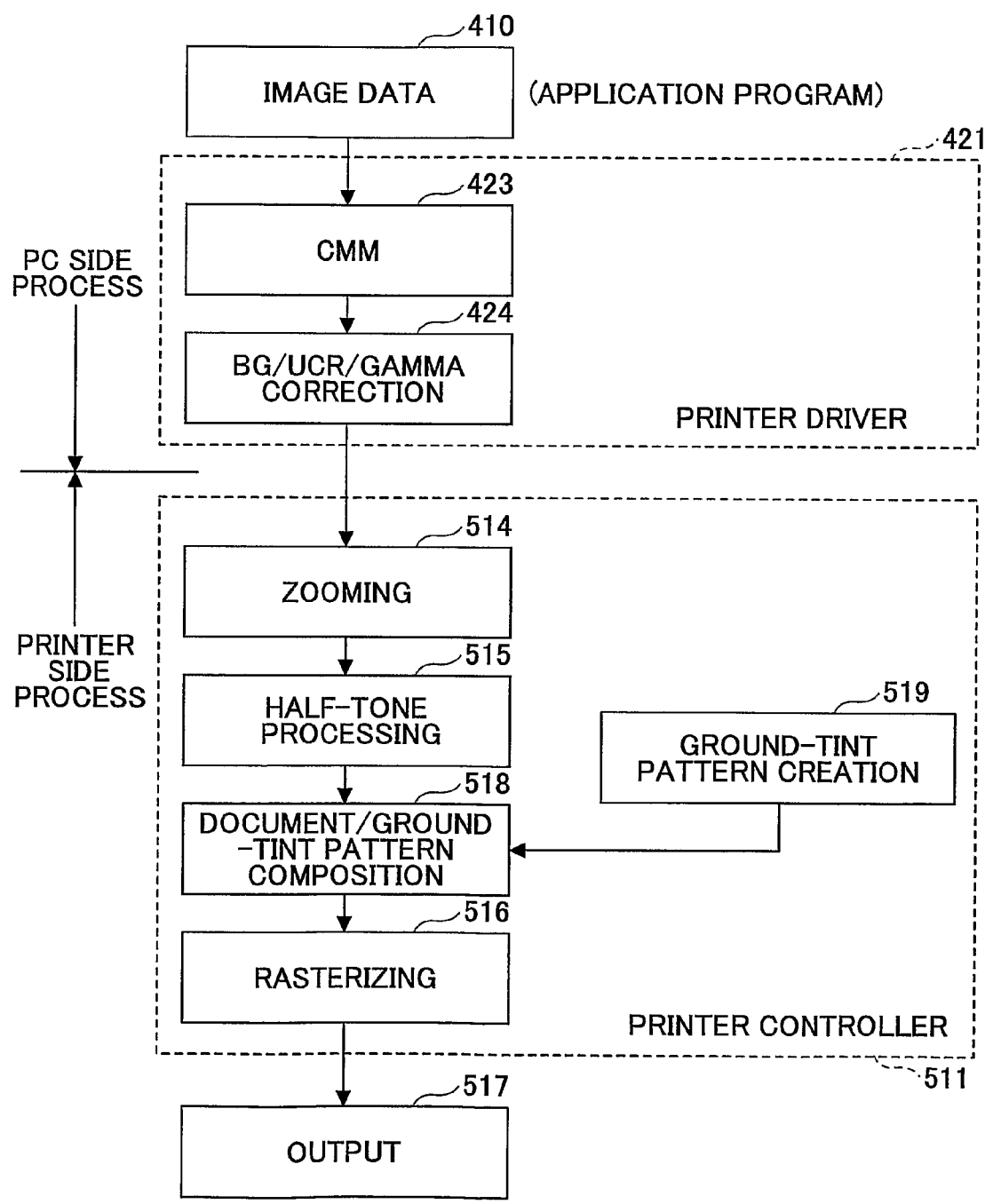
FIG. 11 is a block diagram for explaining the functional composition of another image processing program in the printing system.

Next, the functional composition of another image processing program which is performed in the printing system including the ink-jet printer 500 and the image processing device 400 will be explained with reference to FIG. 11. Since this image processing can be performed at high speed, the composition of FIG. 11 is suitably used with the high-speed device.

The printer driver 421 receives from the image processing device 400 (PC) the image data 410 given by the application program. The CMM (color management module) processing unit 422 performs the color conversion (RGB color system->CMY color system) to the color space for recording equipments from the color space for monitor displays, BG/UCR which performs black generation/lower color removal from the value of CMY (black).

The BG/UCR/gamma correction 423 performs gamma correction which performs the input/output compensation reflecting the characteristics of generation/Under Color Removal processing and recording equipment, or the user's desired. The image data used as the document generated in this BG/UCR/gamma correction 423 are sent out to the ink-jet printer 500.

On the other hand, the printer controller 511 (control unit 200) of the ink-jet printer 500 according to the resolution of recording equipment, the expansion processing, the zooming unit 514 and image data to perform, the dot pattern data of the print image data obtained from the half tone processing unit (multiple value and few value matrix) 515 containing the multiple value and few value matrix replaced with pattern arrangement of the dot injected from recording equipment, and the document and ground-tint pattern composition unit 518 which are mentioned later is divided into the data for every scan.

The output of the rasterizing unit 516 is given to the head control unit 207 including the rasterizing unit 516 which carries out data development according to each nozzle location which records.

In the printer controller 511, the document image data outputted from the half tone processing unit 515 which performed image processing in the document image shown by the image data inputted from the image processing device 400, and is changed into the data according to the multi-value dot in which an output is possible, it has the document and ground-tint pattern composition unit 518 as a unit to superimpose and compound the data of the image pattern in which it is shown that it is a document which inhibits the copy generated by ground-tint pattern generation unit 519.

The print image data according to the dots of the multiple values in which the output is possible is generated by combining the document image data and the data of a ground-tint pattern according to the dots of the multiple values in which an output is possible by this document and ground-tint pattern composition unit 518.

The image processing method of this disclosure is suitably applicable even if it is which composition of FIG. 10 and FIG. 11. An example without the function to generate the dot pattern actually recorded in response to drawing of an image or the print command of a character in equipment explains like composition of being shown in FIG. 10 at the ink-jet printing device side.

Namely, the print command from the application program performed with image processing device 400 which serves as a host, the image processing is carried out by printer driver 411 incorporated as the software in the image processing device 400 (host computer), and the data (print image data) of the dot pattern of the multiple values in which the output of the ink-jet printer 500 is possible is generated. The data is rasterized and transmitted to the ink-jet printer 500. The example of the ink-jet printer 500 which performs the printing will be described.

Specifically, the document data, such as lists and documents, are drawn up in the image processing device 400 (host computer) using the application program (for example, the Microsoft Word or Excel (the registered trademarks)).

With the printing command to this document image from application or an operating system, the printer driver 411 in a host computer, as mentioned above in order to carry out the printing with the ink-jet printer 500, the image processing, such as CMM, BG/UCR, zooming, gamma conversion, and the multiple value and few value matrix processing, is performed, and the drawing data of the document image which includes the dot size information reproducible with the ink-jet printer 500 is created.

On the other hand, a ground-tint pattern is created by the ground-tint pattern creation unit 419. In the ground-tint pattern creation unit 419, the ground-tint pattern (image pattern) which includes dot size information reproducible with the ink-jet printer 500 is generated. That is, the values of the dot size information of the ink-jet printer 500 for the data of the ground-tint pattern and for the drawing data derived from the document are the same.

For example, suppose that the dots of four values are expressed by the data of 2 bits (bit1, bit0). If the data of (bit1, bit0) is (00), it indicates the non-printing. If the data of (bit1, bit0) is (01), it indicates a small drop. If the data of (bit1, bit0) is (10), it indicates a middle drop. If the data of (bit1, bit0) is (11), it indicates a large drop.

Next, the processing of creating the ground-tint pattern data by the ground-tint pattern creation unit 419 will be described.

In the image processing device 400, the data of the ground-tint pattern is held at memories 406, such as a predetermined memory. The CPU 401 reads the data of this ground-tint pattern from the memory 406. The size of the data of a ground-tint pattern is adjusted so that it may draw all over the document size of printed matter, and the ink-jet printer 500 of the ground-tint pattern of the whole document surface size generates the data according to the dots of the multiple values in which the output is possible.

And the data of a ground-tint pattern is compounded by the document and ground-tint pattern composition unit 418 of printer driver 411 with document image data (document).

The document image data are the data of multiple values (for example, 2 bits), and the combining processing is the data of the multiple values same as the data of a ground-tint pattern, for example. As for the data in which the non-printing is indicated in the document image data, the data of (bit1, bit0) is (00).

Therefore, the OR processing (after combining is set to "1" if one of bit(s) is "1") is performed with ground-tint pattern data only when document image data are the (00). When the ground-tint pattern data is data of the dots of multiple values in the non-printing part of a document image, a non-printing part changes to the image data (printing data) of multiple values.

Then, the rasterizing of print image data is carried out according to the composition of the head of the ink-jet printer 500 by the rasterizing unit 216, and the print image data with the delay given according to conversion of data in every direction or arrangement of the nozzles, it is transmitted to the ink-jet printer 500 via the interface.

The ink-jet printer 500 stores the transmitted print image data in the raster-data memory. After the ink-jet printer 500 receives the predetermined data, it prints the image which contains the document image and the ground-tint pattern, on the sheet 22 by driving the printing head 11 in accordance with the print image data.

Next, the ground tint printing (unauthorized copy deterrence/information leakage deterrence system) of this disclosure will be described with reference to FIG. 12 through FIG. 18.

Figure 12:
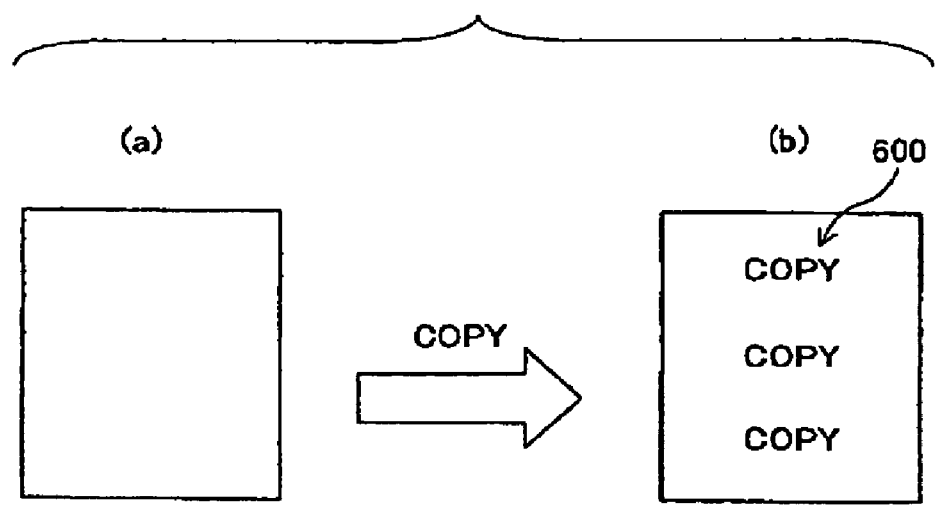
FIG. 12 is a diagram for explaining the printing of a ground tint pattern.
Figure 13:
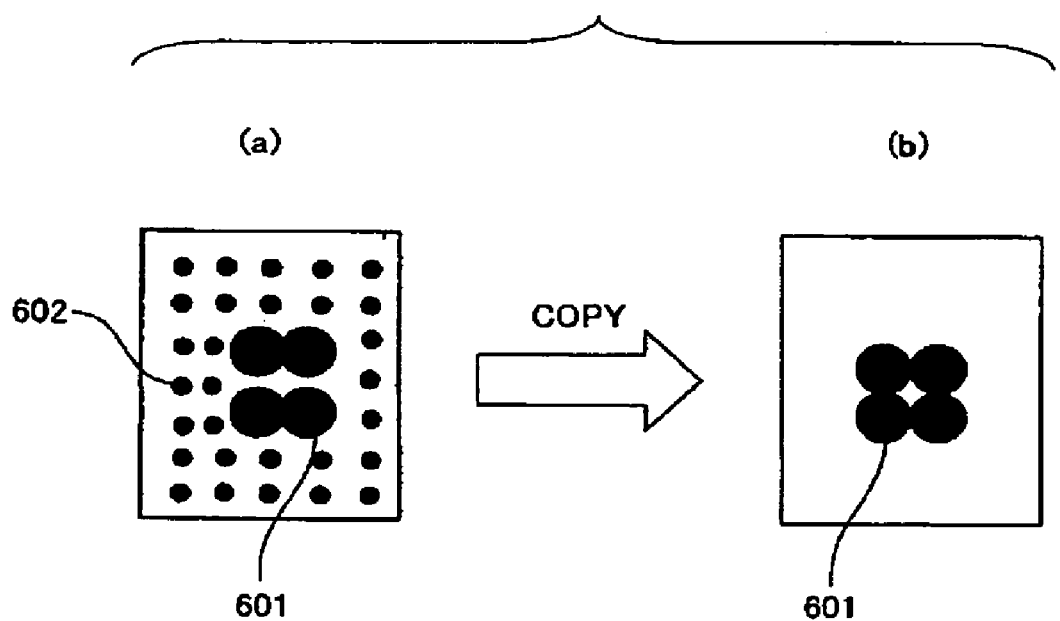
FIG. 13 is a diagram for explaining the printing of another ground tint pattern.
Figure 14:
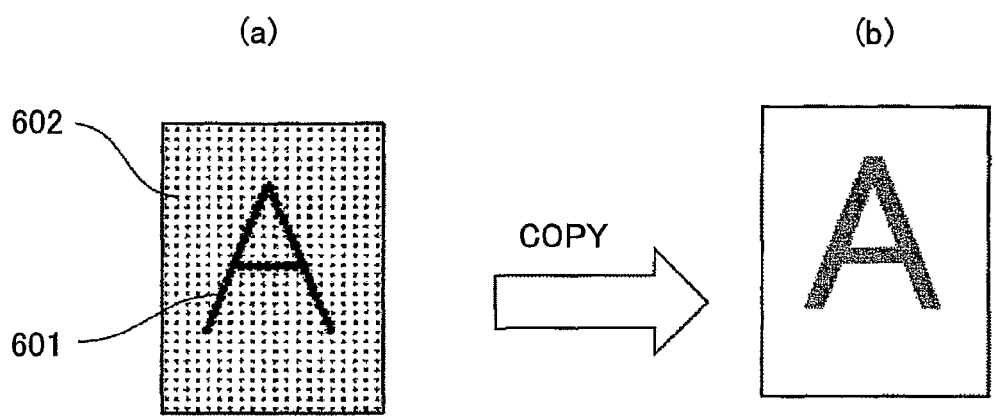
FIG. 14 is a diagram for explaining the effect of the generation of a ground tint in a foreground part of an image.
Figure 15:
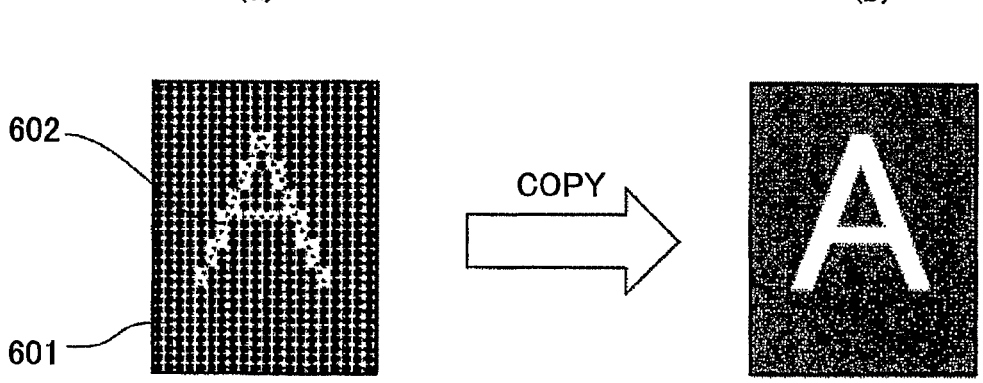
FIG. 15 is a diagram for explaining the effect of the generation of a ground tint in a background part of an image.
Figure 16:
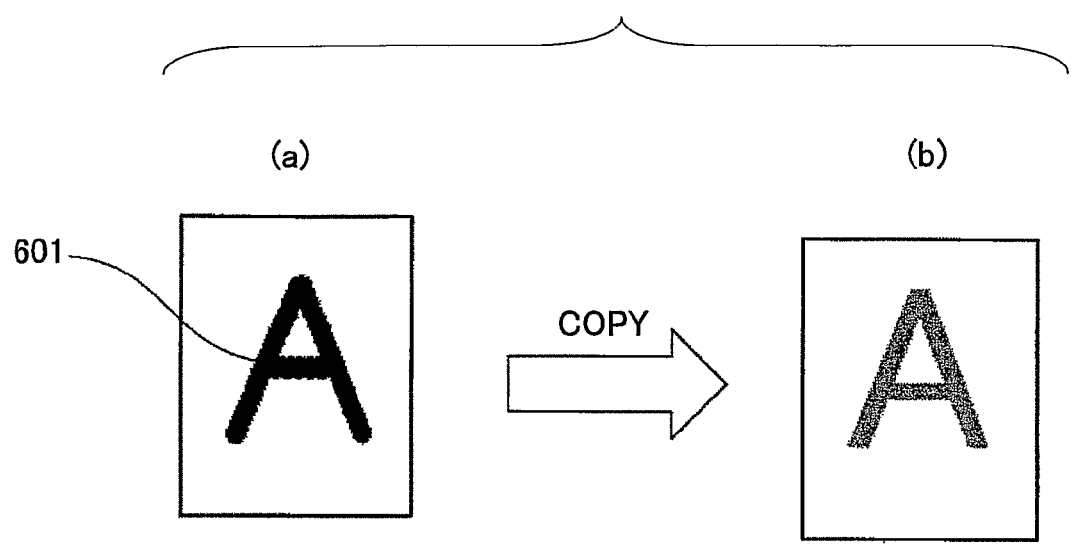
FIG. 16 is a diagram for explaining the reproducibility of a ground tint according to the drop size.
Figure 17:
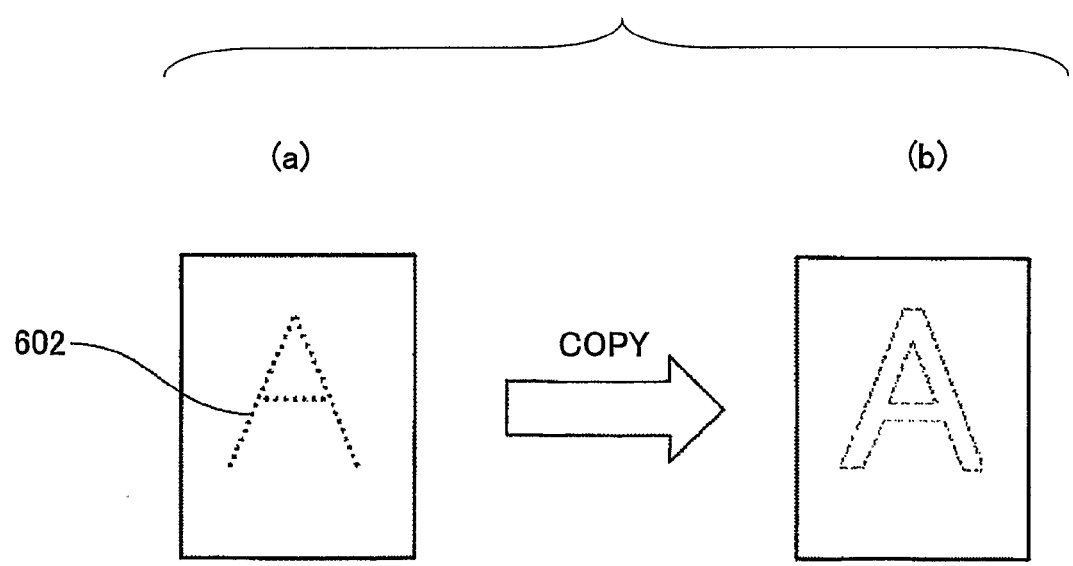
FIG. 17 is a diagram for explaining the reproducibility of a ground tint according to the drop size.
Figure 18:
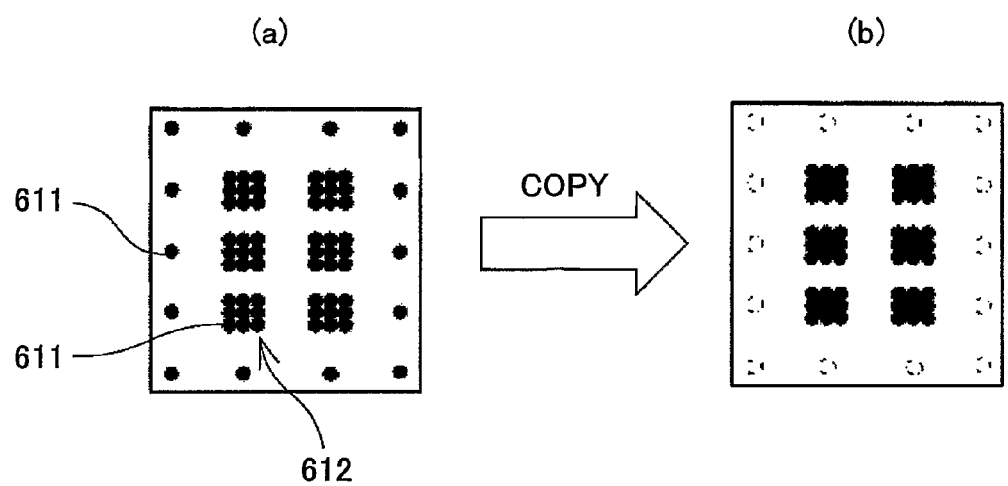
FIG. 18 is a diagram for explaining a ground tint generation method using the dots of minute dot size.

FIG. 12 and FIG. 13 are diagrams for explaining the printing of a ground tint pattern. FIG. 14 and FIG. 15 are diagrams for explaining the effects of the generation of the ground tint in the foreground part and the background part. FIG. 16 and FIG. 17 are diagrams for explaining the reproducibility of the ground according to the ink drop size. And FIG. 18 is a diagram for explaining the ground tint generation method using the dots of a minute dot set.

The flow of the ground tint printing has been explained above. As shown in FIG. 12(a), the ink-jet printer 500 acquires the printed matter (original image) in which the characters or the patterns are embedded as a ground tint, and if the printed matter is copied as shown in FIG. 12(b), the ground tint will be present. In this example, the characters 600 ("copy") are embedded in the foreground part of the printed matter (original image) of FIG. 12(a).

Thereby, it can be distinguished whether it is the copy which is reproduced from the printed matter concerned. This helps the deterrence of an illegal copy by using the ground tint that can be recognized.

This ground tint printing uses the background removal function of the copier. Namely, in the case of the background removal function, a minute dot does not appear after copying, but only the dots which have a size larger than a certain threshold appear after copying. As shown in FIG. 13(a), when the printed matter is formed with the large dots 601 and the small dots 602, the large dots 601 are reproduced after copying, but the small dots 602 are not reproduced as shown in FIG. 13(b).

In the image forming method of this disclosure, as shown in FIG. 14(a), the dots 601 (the black character "A") which are reproduced after copying are included in the foreground part of the original image, and the small dots 602 which are not reproduced after copying are included in the background part of the original image. Namely, the character "A" (ground tint) is embedded in the foreground part.

If this printed matter is copied, as shown in FIG. 14(b), only the image of the foreground part will come to be reproduced and the character "A" will be present in the copy.

In this example, the character "A" (ground tint) embedded in the foreground part of the original image can be present in the copy. In other words, the recording liquid adhesion area of each dot per unit area in the foreground part is made larger than the recording liquid adhesion area of each dot per unit area in the background part, so that the character "A" in the foreground part can be present in the copy.

On the contrary, as shown in FIG. 15(a), the dots 601 which are reproduced after copying are included in the background part of the original image, and the small dots 602 which are not reproduced after copying are included in the foreground part of the original image. Namely, the white character "A" (ground tint) is embedded in the background part.

If this printed matter is copied, as shown in FIG. 15(b), only the image of the background part will come to be reproduced and the white character "A" (the ground tint) will be present in the copy. In other words, the recording liquid adhesion area of each dot per unit area in the background part is made larger than the recording liquid adhesion area of each per unit area in the foreground part, so that the white character "A" in the background part will be present in the copy.

In the ground tint printing mentioned above, the ground tint is constituted by the set of the foreground part and the background part of the original image, and the image of the foreground part is made not conspicuous before copying. Alternatively, it may be configured so that the ground tint is constituted by the foreground part only.

In the case in which the ink-jet printing device is provided to a dot of a variable size, the image in which the ground tint indicating that copying of the original image is inhibited is embedded in one of the foreground part and the background part, and the large dots are included in one of the foreground part and the background part, and the small dots are included in the other of the foreground part and the background part. The difference in the recording liquid adhesion area of each dot per unit area between the foreground part and the background part enables the ground tint to be formed in a copy of the printed matter after copying.

Next, the image forming method of this disclosure in the case in which the ink-jet printing device is provided to a dot of a fixed size will be described.

The reproducibility of the ground tint according to the ink drop size will be described with reference to FIG. 16 and FIG. 17.

FIG. 16 shows the reproducibility of the ground tint in the case where the ink drop which can be ejected by the ink-jet printing device has a large size. FIG. 17 shows the reproducibility of the ground tint in the case where the ink drop which can be ejected by the ink-jet printing device has a small size.

When the ink drop size is large and the dot is large, the dot can be reproduced. As shown in FIG. 16, the ground tint may be included in the foreground part, but the ground tint may not be included in the background part.

On the other hand, there is no reproducibility of the ground tint which is constituted by the small dots. The image of the foreground part is not reproduced. As shown in FIG. 17, the ground tint may be included in the background part, but the ground tint may not be included in the foreground part.

Next, the ground tint generation method using the dots of minute dot size will be described with reference to FIG. 18. The minute dots are not reproduced after copying, and the ground tint using the minute dots may not be included in the foreground part. However, a plurality of adjoining small dots which constitute the ground tint may be used to obtain the ink adhesion area as large as the large dots. A good reproducibility of the ground tint can be obtained by using the plurality of adjoining small drops.

Even if the original image is copied in this state, it is possible to reproduce the dots after copying. For example, when the minute dots 611 are separately arranged at intervals of a predetermined distance as shown in FIG. 18(a), they are not reproduced after copying as shown in FIG. 18(b).

On the other hand, when the sets of adjoining minute dots 611 are collectively arranged as the dot sets 612 in rows and columns at intervals of a predetermined distance as shown in FIG. 18(a), they are reproduced after copying as shown in FIG. 18(b).

Figure 19A:
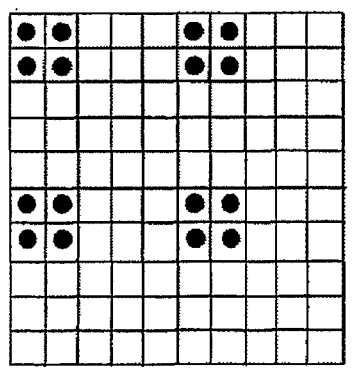
FIG. 19A and FIG. 19B are diagrams for explaining an example of a minute dot set.
Figure 19B:
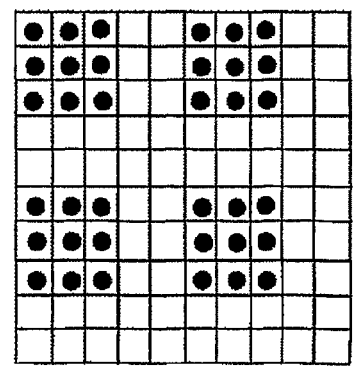

Specifically, as shown in FIG. 19A and FIG. 19B, the sets of 2×2 adjoining dots which are separated by a given number of dots are included in the background part of the original image, and the 3×3 adjoining dots which are separated by a given number of dots are included in the foreground part. Alternatively, the dot arrangement at this time may be made such that the dots are separately included in the background part and the sets of adjoining dots are included in the foreground part only.

Therefore, the ground tint printing can be performed such that the foreground part is constituted by the sets of adjoining minute dots, and the background part is constituted by the minute dots.

There is a case in which the resolution is low, the pitch between the adjoining dots is large even if the adjoining dots are arranged, and the individual dots are separate from each other. In such a case, a plurality of ink drops corresponding to the plurality of adjoining dots are ejected to a same location on the recording medium. The ink blotting to the recording medium is caused and an adequate ink adhesion area of each dot needed for the foreground part is obtained. Or the arrangement of the plurality of adjoining dots is achieved by electrically controlling the dot ejection position on the recording medium.

In this case, the ejection of the plurality of drops to the same location on the recording medium cannot be performed by performing one main scanning operation, and the plurality of drops are ejected to the same location by continuously repeating a number of main scanning operations.

Thus, a plurality of adjoining dots are formed to constitute a ground tint embedded in one of the foreground part and the background part. Or the plurality of adjoining dots which constitute the ground tint are formed by ejecting a plurality of drops to a same location on the recording medium. Even when the ink-jet printing device is provided to form a dot of a single fixed size, a reproducible recording liquid adhesion area of each dot can be obtained and the ground tint can be printed. The ground tint printing can be performed also in the case of low resolution.

Unlike the image forming device of the electrophotographic printing method, the ink blotting may arise after the ink adheres to the recording medium in the case of the ink-jet printing device. In the case of the ink-jet printing device, a background part and a foreground part cannot be distinguished by the number of pixels as in the ground tint printing used in the image forming device of the electrophotographic printing method, and the consideration of ink drop adhesion area is important.

The diameter of a dot that can be reproduced by the ink-jet printing device (copier) is varied depending on the lightness characteristics of the printing color. The diameter of a dot needed for the reproduction after copying in the case of high lightness (bright) is larger than that in the case of low lightness (dark). For example, it is necessary to make the diameter of a dot of the foreground part in the case where the printing color is cyan larger than that in the case where the printing color is black. Changing the ink adhesion area according to the level of the lightness characteristics enables the ground tint printing to be performed in various printing colors.

As shown in FIG. 17, when the ground tint containing the minute dot 602 is formed in the foreground part, the ink adhesion area of the ground tint embedded in the original image is made smaller than the threshold of the copier at the time of copying the original image. For this reason, the ground tint included in the original image can be made such that the ground tint does not appear in the reproduced image after copying it. By using the feature, it is possible to detect whether it is the copied image.

This disclosure is not limited to the above-described embodiments and variations and modifications may be made without departing from the scope of this disclosure.

Further, the present application is based on and claims the benefit of priority of Japanese patent application No. 2005-078349, filed on Mar. 18, 2005, and Japanese patent application No. 2005-210724, filed on Jul. 21, 2005, the entire contents of which are hereby incorporated by reference.

The invention claimed is:

1. An image forming method using an ink-jet printing device which forms a dot on a recording medium by ejecting a drop of recording liquid, the image forming method comprising the steps of:
   forming an image in which a ground tint is embedded in one of a foreground part and a background part of an original image, the ground tint indicating that copying of the original image is inhibited; and
   making an adhesion area of the dots of the recording liquid per unit area of the recording medium in the foreground part different from an adhesion area of the dots of the recording liquid per unit area of the recording medium in the background part,
   wherein a first plurality of adjoining dots constitute a background of the ground tint, and
   wherein a foreground part of the ground tint is constituted by a second plurality of adjoining dots arranged at intervals of a predetermined distance or, if a pitch between adjoining dots is large, a third plurality of adjoining dots formed by ejecting a plurality of drops of the recording liquid to a same location on the recording medium.

2. The image forming method according to claim 1, wherein the adhesion area of the dots of the recording liquid per unit area of the recording medium in the background part is larger than the adhesion area of the dots of the recording liquid per unit area of the recording medium in the foreground part.

3. The image forming method according to claim 1, wherein the adhesion area of the dots of the recording liquid per unit area of the recording medium in the foreground part is larger than the adhesion area of the dots of the recording liquid per unit area of the recording medium in the background part.

4. The image forming method according to claim 1, wherein the ink-jet printing device is provided to form a dot of a variable size on the recording medium, and a plurality of adjoining dots constitute the ground tint.

5. The image forming method according to claim 1, wherein the ink-jet printing device is provided to form a dot of a fixed size on the recording medium, and a plurality of adjoining dots constitute the ground unit.

6. The image forming method according to claim 1, wherein the adhesion area of the dots of the recording liquid per unit area of the recording medium is varied depending on lightness characteristics of a color of the recording liquid being used.

7. A computer-readable recording medium storing a program which causes a computer to execute the image forming method according to claim 1.

8. An ink-jet printing device which forms a dot on a recording medium by ejecting a drop of recording liquid, the ink-jet printing device comprising:
   a ground-tint pattern creation unit adapted to form an image in which a ground tint is embedded in one of a foreground part and a background part of an original image, the ground tint indicating that copying of the original image is inhibited; and a control unit adapted to make an adhesion area of the dots of the recording liquid per unit area of the recording medium in the foreground part different from an adhesion area of the dots of the recording liquid per unit area of the recording medium in the background part, wherein a first plurality of adjoining dots constitute a background of the ground tint, and wherein a foreground part of the ground tint is constituted by a second plurality of adjoining dots arranged at intervals of a predetermined distance or, if a pitch between adjoining dots is large, a third plurality of adjoining dots formed by ejecting a plurality of drops of the recording liquid to a same location on the recording medium.

* * * * *